US008079651B2

(12) United States Patent
Cvek

(10) Patent No.: US 8,079,651 B2
(45) Date of Patent: *Dec. 20, 2011

(54) MOTION CONTROL FOR EXTENSION AND RETRACTION ARRANGEMENTS

(76) Inventor: Sava Cvek, Jamaica Plain, MA (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/573,864

(22) Filed: Oct. 5, 2009

(65) Prior Publication Data

US 2010/0084535 A1    Apr. 8, 2010

Related U.S. Application Data

(63) Continuation-in-part of application No. 11/152,994, filed on Jun. 14, 2005, now Pat. No. 7,621,489, and a continuation-in-part of application No. 11/152,952, filed on Jun. 14, 2005, now Pat. No. 7,665,709.

(60) Provisional application No. 61/102,746, filed on Oct. 3, 2008, provisional application No. 60/521,660, filed on Jun. 14, 2004, provisional application No. 60/668,423, filed on Apr. 5, 2005.

(51) Int. Cl.
*A47B 17/00* (2006.01)

(52) U.S. Cl. ........................................ 312/196; 312/906

(58) Field of Classification Search .................. 248/132, 248/161, 125.1, 125.2, 157, 27.1, 27.3, 279.1, 248/285.1, 298.1, 920, 414, 416; 108/50.01, 108/50.02, 25; 312/312, 196, 7.2, 306, 319.5, 312/319.7, 223.3; 361/681, 682
See application file for complete search history.

(56) References Cited

U.S. PATENT DOCUMENTS

| 4,568,132 | A  | * | 2/1986  | Watt ............................. 312/312 |
| 5,273,352 | A  | * | 12/1993 | Saper ............................ 312/7.2 |
| 6,494,150 | B1 |   | 12/2002 | Phoenix et al. |
| 7,043,810 | B2 | * | 5/2006  | Bober ............................ 29/401.1 |
| 7,517,029 | B2 | * | 4/2009  | Cvek ............................. 312/196 |
| 7,621,489 | B2 | * | 11/2009 | Cvek ............................. 248/132 |
| 7,665,709 | B2 | * | 2/2010  | Cvek ............................. 248/669 |
| 2005/0057129 | A1 |   | 3/2005  | Bober |
| 2006/0169188 | A1 |   | 8/2006  | Latino et al. |
| 2008/0018590 | A1 |   | 1/2008  | Lin |
| 2008/0060560 | A1 |   | 3/2008  | Chen |

FOREIGN PATENT DOCUMENTS

| JP | H02-198508 | 7/1990 |
| JP | H03-11284 | 2/1991 |
| JP | H07-20971 | 1/1995 |
| JP | H07-289357 | 11/1995 |
| JP | H08-131263 | 5/1996 |
| JP | 2000-023759 | 1/2000 |
| WO | WO03/050787 | 6/2003 |

* cited by examiner

*Primary Examiner* — A. Joseph Wujciak, III
(74) *Attorney, Agent, or Firm* — O'Connell Law Firm

(57) ABSTRACT

An extension and retraction arrangement with a control system for adjusting a monitor from a retracted configuration to an extended configuration. The control system controls an extension and retraction of a trolley structure and a retained monitor and an opening and closing of a door through which the monitor can be extended. The control system has an operation mode with an UP sequence and a DOWN sequence. Sensors can sense open and closed positions of the door and raised and extended and retracted positions of the trolley and the monitor. The control system can automatically react to monitor positioning issues, losses in power, and obstructions to the travel of the door and the trolley structure.

17 Claims, 28 Drawing Sheets

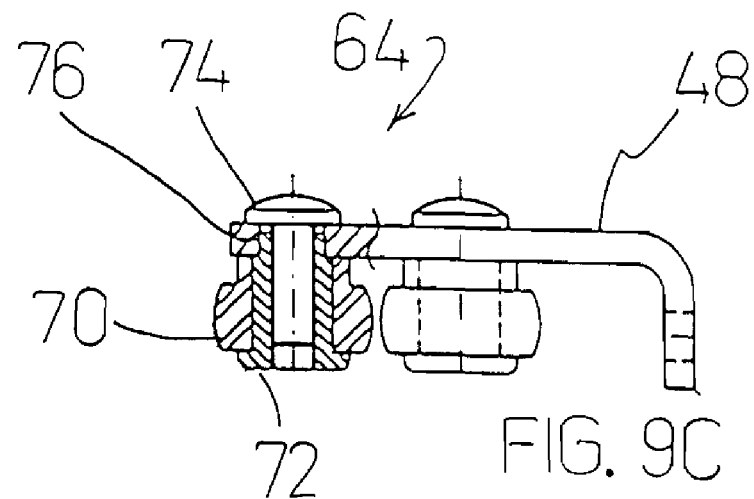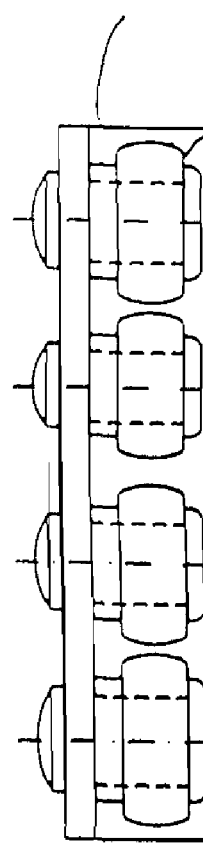

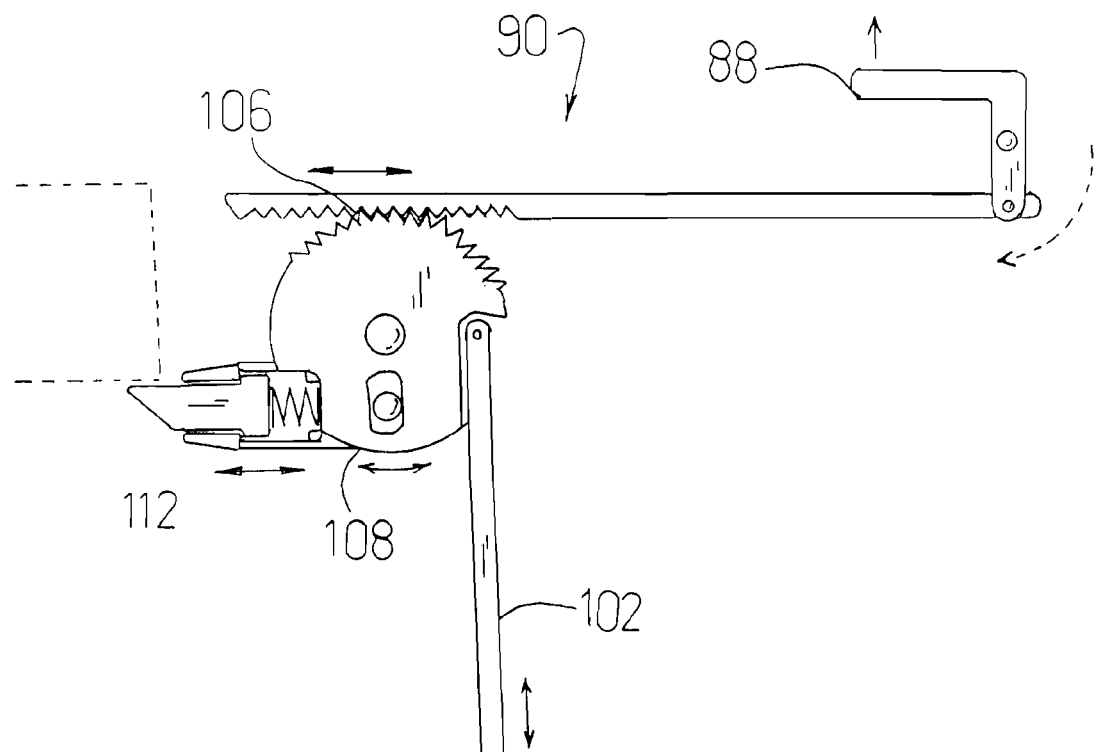
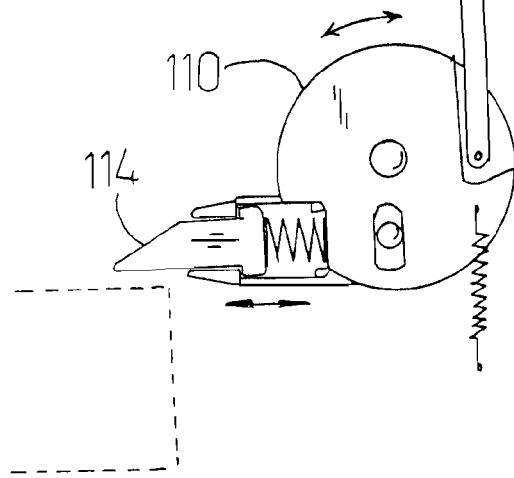
FIG. 12

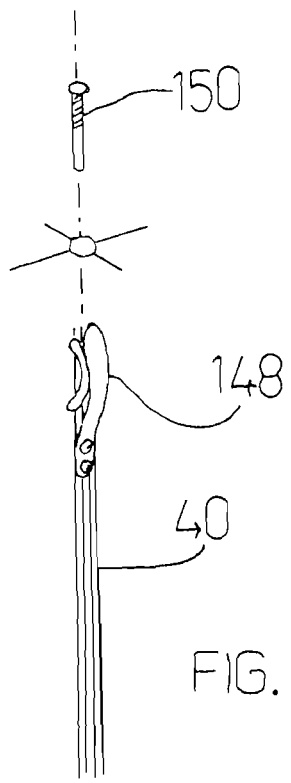
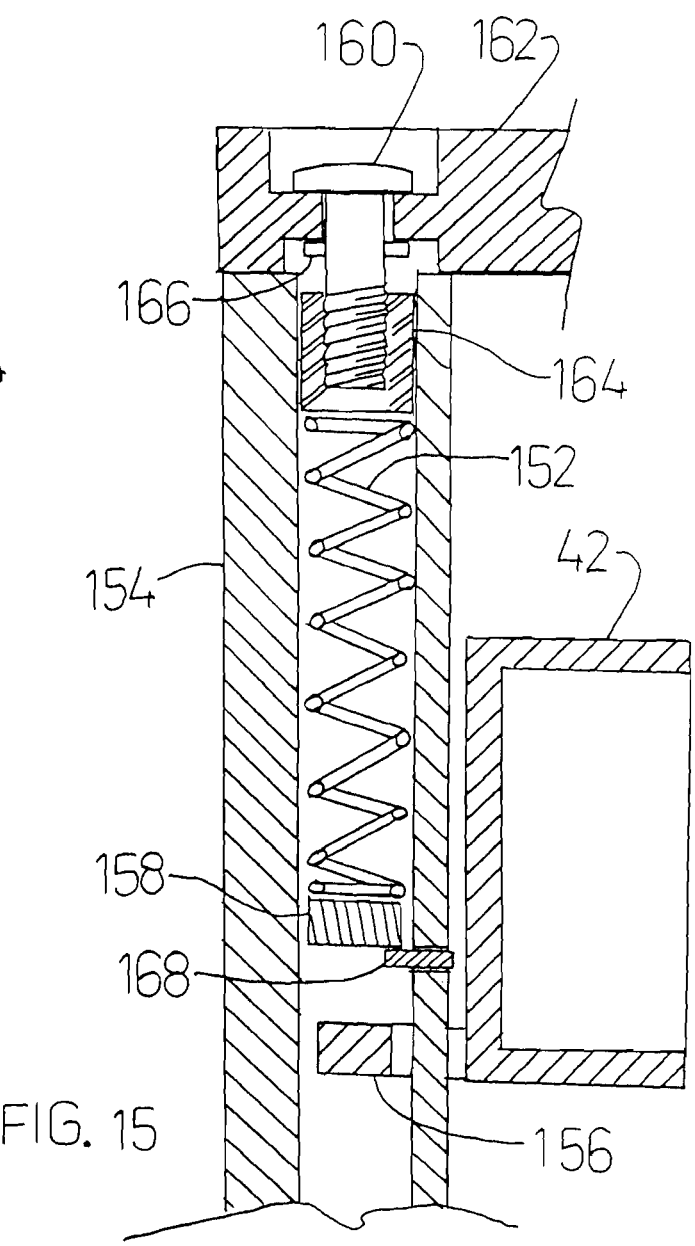

MOTION CONTROL FOR EXTENSION AND RETRACTION ARRANGEMENTS

FIELD OF THE INVENTION

The present invention relates generally to systems for supporting articles. More particularly, disclosed herein are control and actuation systems for use in relation to extension and retraction arrangements enabling an adjustment of a supported article, such as a computer, computer monitor, or other computer component or components, between extended and retracted configurations.

BACKGROUND OF THE INVENTION

Computers have become an integral part of our business and personal lives. The presence of a computer monitor, a keyboard, or a laptop or other computer component has come to be seen as a necessary evil for the accomplishment of one's daily tasks. With the computer components inherently come wires that further clutter work surfaces. Many computer components, particularly computer monitors, have achieved reduced size. However, when not in use, they remain as obstacles to the full usage of a work surface and contribute to a utilitarian and often displeasing appearance of the work surface and the office in general. Further, continuous exposure leaves the computer components vulnerable not only to environmental conditions but also to tampering and theft, particularly as the components become smaller, lighter, and more portable.

It would be advantageous, therefore, if one could enjoy full usage of a computer, computer component, or other article when desired while being able to make the article effectively disappear from a work surface when its presence is no longer necessary. A number of talented inventors have sought to provide mechanisms for enabling a manipulation of a computer or computer component, such as a monitor, between use and storage configurations. To date, however, the proposed solutions of the prior art, such as those disclosed in U.S. Pat. No. 5,526,756 to Watson, U.S. Pat. No. 6,494,150 to Phoenix et al., and U.S. Pat. No. 6,733,094 to Chang, have been bulky and inelegant, of limited effectiveness, and relatively complex in structure and operation. Furthermore, prior art mechanisms and furniture have been ill equipped to accommodate one another.

With previous application Ser. Nos. 11/152,994 and 11/152,952 and U.S. Pat. No. 7,517,029, the present inventor has disclosed arrangements for extending and retracting a monitor, computer, or other computer component or components that sought to provide improvements in structure and function over the prior art. The disclosed extension and retraction arrangements provide improved systems for efficiently extending a trolley with a support arm to enable use of a monitor or other component and retracting the trolley, support arm, and component to a storage position enabling full usage of a work surface. Also disclosed are improved door constructions for efficiently closing off an aperture through which the support arm and component are passed, including while the support arm and component are in an extended disposition. Still further, the inventor disclosed systems for manually and electrically controlling and propelling the extension and retraction arrangements.

Despite the advantageous improvements represented by these earlier disclosures, it became clear to the present inventor that there remained room for improvements over even those earlier-disclosed systems and methods. By way of example, it was found that even the most well designed extension and retraction system operating under power required a motion control system and methodology for dealing with initial installation, raising and lowering procedures, and procedures in the event of each possible malfunction, including physical obstructions, power failures, and positional anomalies. It has also been determined that it was possible to improve over even the inventor's own advantageous door constructions to provide a door arrangement that can be smoothly and efficiently adjusted between an open position for permitting passage of a support arm and retained component through an aperture and a closed position substantially entirely closing the aperture not only while the support arm and retained component are retracted but also while the support arm and retained component are extended.

SUMMARY OF THE INVENTION

The present inventor thus set forth with a basic object of providing a motion control system for an extension and retraction system that provides procedures for facilitating the initial installation and setup of the extension and retraction system, procedures for the standard raising and lowering a support arm and a retained component, and procedures for operation in the event of operational malfunctions.

A more particular object of embodiments of the invention is to provide a motion control system for an extension and retraction arrangement that prevents damage to the system and a retained component in the event of an obstruction to movement of the support arm or the door arrangement.

Another particular object of particular embodiments of the invention is to provide a motion control system for an extension and retraction arrangement that prevents operation where a retained component is out of proper orientation for permitting movement of the support arm and the retained component.

A further object of embodiments of the invention is to provide an improved door arrangement that can be smoothly and efficiently adjusted between an open position for permitting passage of a support arm and retained component through an aperture and a closed position.

A further object of certain embodiments of the invention is to provide a door arrangement that can substantially entirely close the aperture not only while the support arm and retained component are retracted but also while the support arm and retained component are extended.

These and in all likelihood further objects and advantages of the present invention will become obvious not only to one who reviews the present specification and drawings but also to those who have an opportunity to experience an embodiment of the systems and arrangements disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawing figures:

FIGS. 9A, 9B, and 9C comprise side, front, and top plan views of a portion of a trolley structure under the present invention;

FIG. 12 is a perspective view of an alternative manual actuation arrangement;

FIG. 14 is a perspective view of a braking arrangement;

FIG. 15 is a cross sectional view of an alternative braking arrangement pursuant to the invention disclosed herein;

DETAILED DESCRIPTION OF PREFERRED EMBODIMENTS

The extension and retraction arrangements disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

While a flat screen monitor is commonly depicted as the article to be supported and the article is commonly retained relative to a desk or similar structure, it is to be understood that other articles and support structures are contemplated within the scope of the invention. Furthermore, except where otherwise specified, extension and retraction can be carried out manually by the user, by a motorized arrangement, or by any combination thereof. Therefore, before any particular embodiment of the invention is explained in detail, it must be made clear that the following details of construction and illustrations of inventive concepts are mere examples of the many possible manifestations of the invention.

Figure 1:
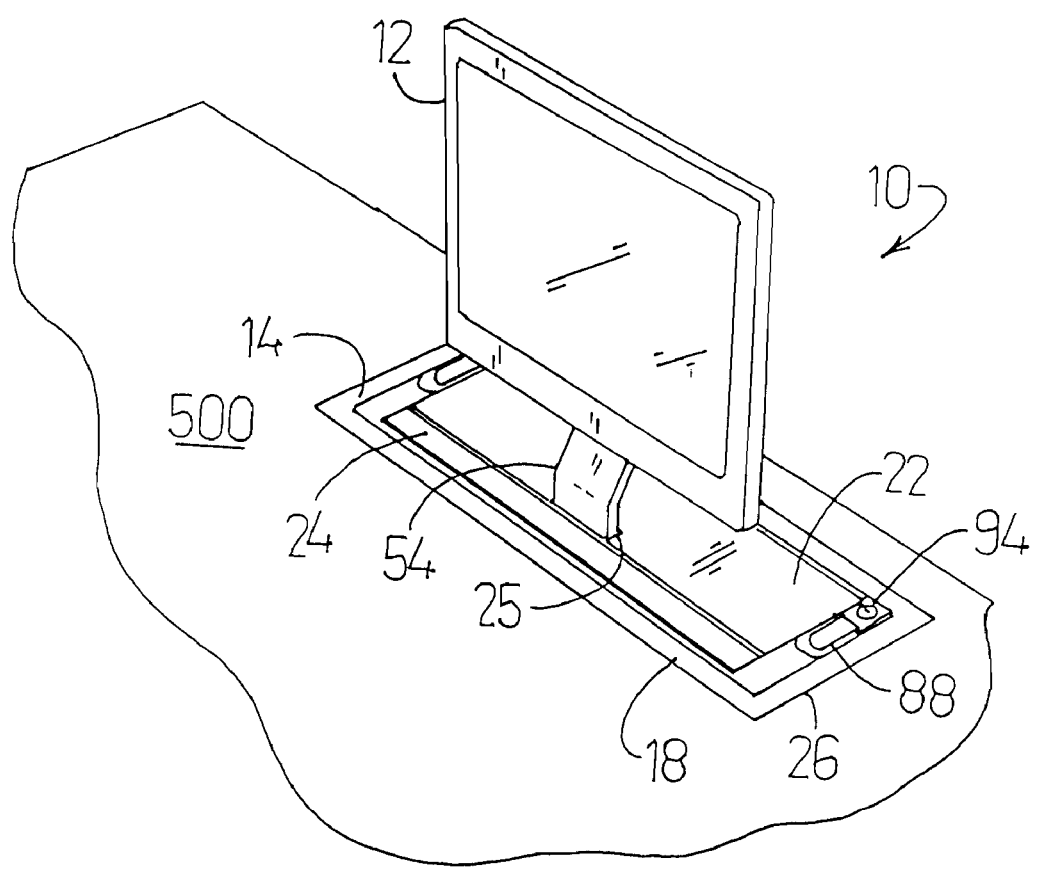
FIG. 1 is a perspective view of an extension and retraction arrangement pursuant to the invention disclosed herein in an extended configuration and retained in relation to a support structure.
Figure 2:
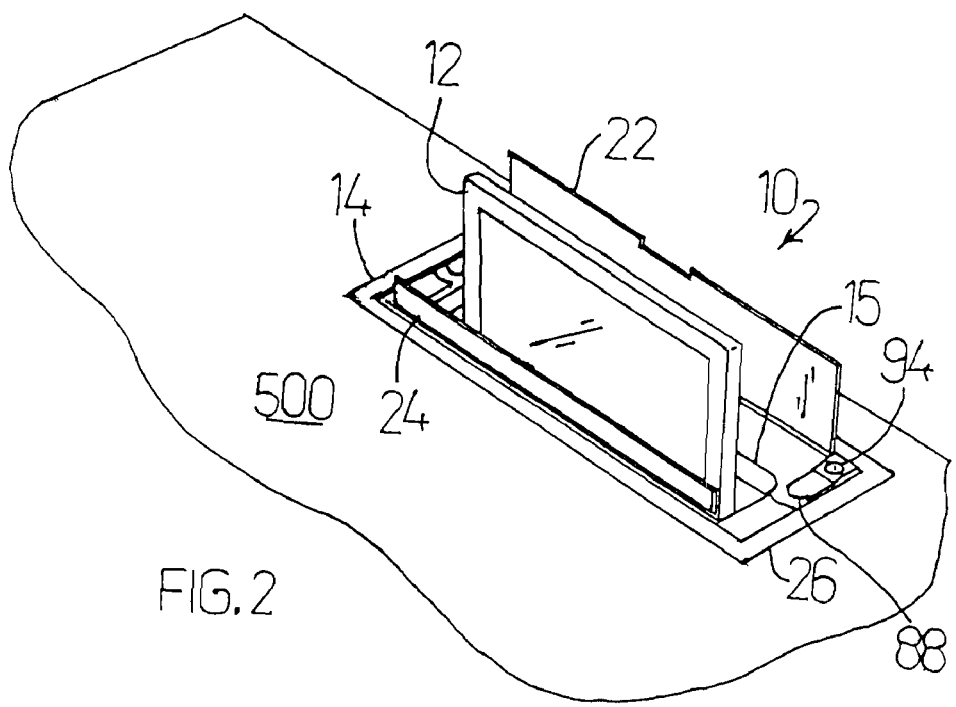
FIG. 2 is a perspective view of the extension and retraction arrangement of FIG. 1 in a partially extended configuration.
Figure 3:
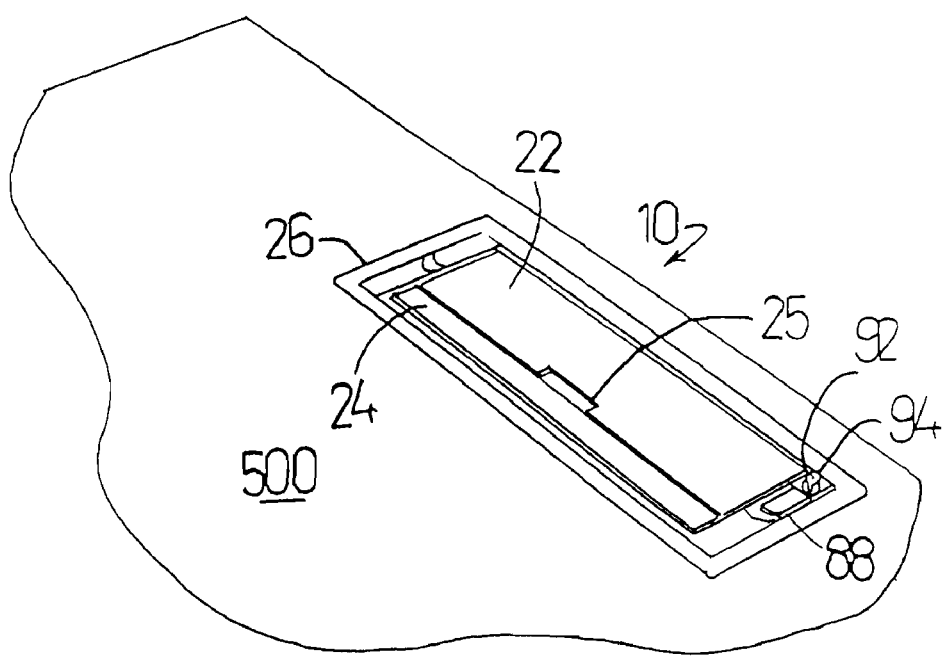
FIG. 3 is a perspective view of the extension and retraction arrangement of FIG. 1 in a retracted configuration.

Turning more particularly to the drawings, an embodiment of an extension and retraction arrangement pursuant to the present invention is indicated generally at 10 in FIGS. 1 through 3. In FIG. 1, a supported article, in this example a flat panel computer monitor 12, is shown in a fully extended position in relation to a support structure 500, which can comprise a desk. The monitor 12 is retained relative to a distal portion of a centrally disposed support arm 54. The support arm 54 supports the monitor 12 for extension and retraction through an aperture 15 in the support structure 500 by mechanisms described more fully hereinbelow.

The extension and retraction arrangement 10 has an upper framework 14. An upper flange 26 can be engaged with the upper framework 14 and can overly the surface of the support structure 500. First and second doors 22 and 24 can be pivotally coupled to the upper framework 14 to enable a pivoting between the closed configuration shown in FIGS. 1 and 3 and the open configuration depicted in FIG. 2. An arm aperture 25 can be provided in either or both of the doors 22 and 24, in this example just the first door 22, to enable the doors 22 and 24 to reach a fully closed configuration even while the monitor 12 and support arm 54 are fully extended. Advantageously, when the first and second doors 22 and 24 are pivoted to a closed configuration, the aperture 15 in the support structure 500 can be effectively sealed, and a generally continuous surface can be presented, whether below the monitor 12 as in FIG. 1 or above the monitor 12 as in FIG. 3.

Operation of the first and second doors 22 and 24 can be controlled by any effective means. In certain embodiments, for example, the first and second doors 22 and 24 can be spring loaded and latched by a latching means that enables an opening of the first and second doors 22 and 24 by a further depression of the doors 22 and 24 to release the latching means. Alternatively, as will be elaborated upon below, a trigger 88 can enable an automatic opening of the first and second doors 22 and 24 and, additionally or alternatively, a raising of the monitor 12 and the support arm 54. Operation of the trigger 88 can be controlled by a lock 94 that can be operated by a key 92, a keycard, or any other means.

Use of such an extension and retraction arrangement 10 can begin with the monitor 12 or other article retained below or within a surface of a support structure 500. The first and second doors 22 and 24 can be opened, such as by an actuation of the trigger 88. The support arm 54 and the retained monitor 12 can then rise through motorization, through mechanical forces, or, additionally or alternatively, by manual actuation by the user. By means disclosed herein, the monitor 12 and support arm 54 can be locked in a fully raised position. Then, the first and second doors 22 and 24 can, if necessary or desirable, be pivoted to a closed configuration as in FIG. 1. When the monitor 12 or other article is no longer needed, the doors 22 and 24 can be opened and the monitor 12 and support arm 54 can be retracted as in FIG. 2 by any suitable method including gravity, motorization, mechanical forces, manual actuation, or any combination thereof. Again by means disclosed herein, the monitor 12 and support arm 54 can potentially be locked in a retracted position and the first and second doors 22 and 24 can be manually or automatically pivoted to a closed configuration as in FIG. 3.

Figure 4:
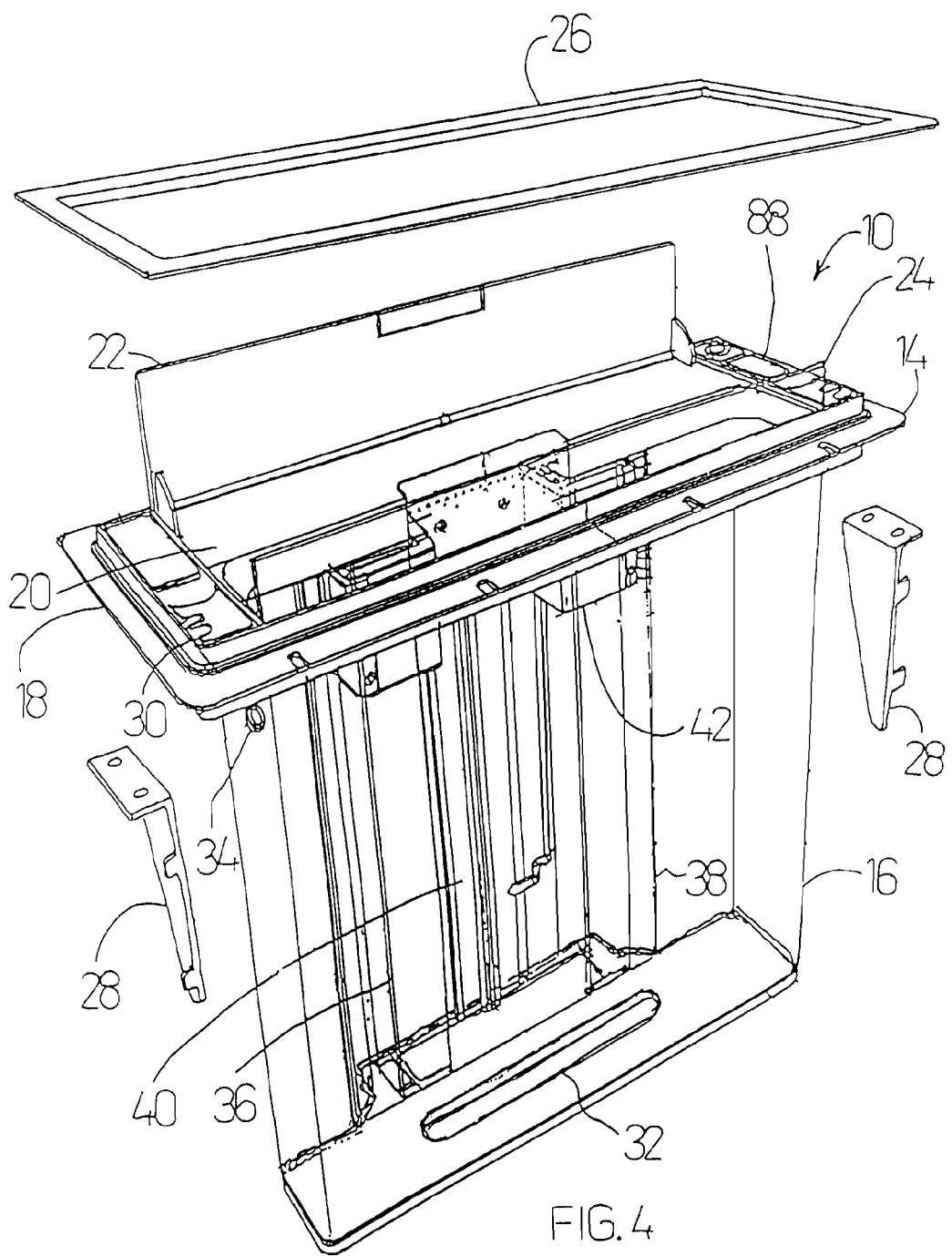
FIG. 4 is a perspective view of an extension and retraction arrangement as disclosed herein apart from a support structure.

An embodiment of an extension and retraction arrangement 10 is depicted apart from the support structure 500 in FIG. 4. There, the extension and retraction arrangement 10 the upper framework 14 can be seen to have a peripheral flange 18 for being retained in relation to a support surface (not shown in FIG. 4) that has an aperture formed therein for receiving the extension and retraction arrangement 10. A subsurface enclosure 16 is fixed to the upper framework 14. The subsurface enclosure 16 defines a protected open inner volume for receiving an article to be retained when the article is in a refracted configuration.

The subsurface enclosure 16 and the upper framework 14 have a shared open mouth 20 that can be selectively closed by the pivotally retained first door 22 in combination with the pivotally retained second door 24. One or more apertures 32 can be disposed in a distal portion of the subsurface enclosure 16 for enabling, among other things, a retrieval of debris and a passage of wiring where necessary. Additionally, one or more wire management apertures 34 can be disposed along a proximal portion of the subsurface enclosure 16 for enabling a passage of wiring and the like. Still further, a removable or pivotable wire management cover 30 can enable further wiring and other access to the open inner volume of the subsurface enclosure 16. The upper flange 26 can couple to the upper framework 14 and can overlie an aperture in a support surface. First and second mounting stabilizers 28 can each have a proximal portion fixed to the support surface and, additionally or alternatively, the upper framework 14 and a distal portion fixed to the subsurface enclosure 16 for providing stabilizing support thereto.

First and second rails 36 and 38 communicate longitudinally within or along the subsurface enclosure 16 from adjacent to the distal end thereof to adjacent to the proximal end thereof. The first and second rails 36 and 38, which are fixed in relation to the subsurface enclosure 16 and the upper framework 14, can be formed and fixed in place separately. Alternatively, as is shown in FIGS. 4 through 8, the first and second rails 36 and 38 can be joined with a spine member 40, such as by being unitarily formed therewith as by an extrusion process or the like or by being fixed thereto.

In either case, a trolley structure 42 can be slidably retained relative to the first and second rails 36 and 38 for reciprocating movement therealong between what can be termed an extended disposition as is depicted in FIG. 4 where the trolley structure 42 is disposed adjacent to the mouth 20 of the subsurface enclosure 16 and the upper framework 14 and a retracted disposition where the trolley structure 42 is disposed adjacent to what can be considered the distal end of the subsurface enclosure 16. The open inner volume of the subsurface enclosure 16 can have a truncated T shape with a head portion of the T provided for reception of the article to be supported, such as a monitor 12, and the base portion of the T for receiving the first and second rails 36 and 38 and the spine member 40.

A greater understanding of the trolley structure 42, the first and second rails 36 and 38, and the relationship therebetween can be had with additional reference to FIGS. 7, 8, and 9A through 9C. The trolley structure 42 can have a central portion 44 with first and second wing portions 46 and 48 fixed thereto, such as by fasteners 50 or by being formed integrally therewith. The central portion 44 can have a centrally disposed alcove 52 with a width $W_1$ disposed inboard of the first and second rails 36 and 38 for receiving a support arm 54 whereby the trolley structure 42 and the first and second rails 36 and 38 can operate with a lesser depth D than might otherwise be required.

Figure 13:
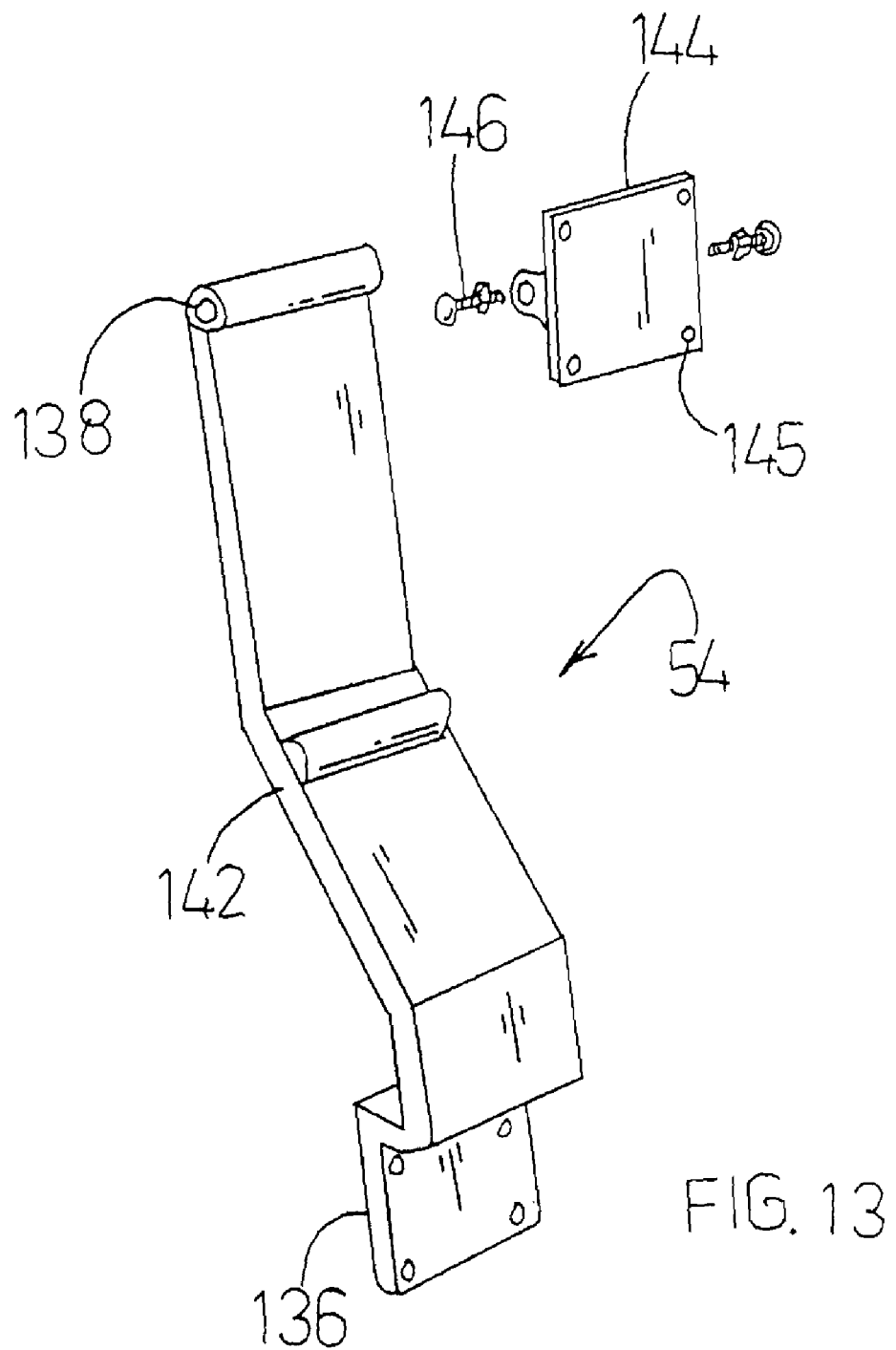
FIG. 13 is a perspective view of a support arm.

One exemplary support arm 54 is shown apart in FIG. 13. There, the support arm 54 can be seen to have a base portion 136 for being fixed to the trolley structure 42, such as by mechanical fasteners 56 as in FIG. 7, a contoured body portion 142, and a tip portion 138. In this example, the tip portion 138 comprises a sleeve for pivotally retaining a support plate 144 by use of axle rods 146. The support plate 144 can have threaded mounting holes 145 therein for enabling a fastening to a flat screen monitor, such as pursuant to the standardized Video Electronics Standards Association Flat Display Mounting Standard for flat panel monitors.

Each rail 36 and 38 can comprise a side plate 58 with a rigid ventral fin 60 projecting laterally from a ventral side thereof and a rigid dorsal fin 62 projecting laterally from a dorsal side thereof. A plurality of wheel structures 64 can project inboard from the wing portions 46 and 48 for rolling along one or both of the ventral fin 60 and the dorsal fin 62. As FIG. 9C shows, each wheel structure 64 can comprise an outer wheel 70 rotatably retained relative to an axle 74 with a bushing 72 therebetween. While the outer wheels 70 could be formed from a variety of materials, one presently contemplated embodiment has outer wheels 70 formed from a high strength acetal resin, such as that sold under the trademark DELRIN.

The bushing 72 of each wheel structure 64 can have a head portion for retaining the outer wheel 70 thereon, a body portion for being received within the outer wheel 70, and a narrowed tip portion for being received in an aperture 76 in the wing portion 46 or 48. The tip portion of the bushing 72 can ensure a centering and precise location of the wheel structure 64 in relation to the aperture 76 and the wing portion 46 or 48 in general. Channels 66 and 68 can communicate longitudinally along the ventral and dorsal fins 60 and 62 for receiving and engaging the wheels 70 of the wheel structures 64. Each of the outer wheels 70 can have an arcuate or otherwise contoured profile for engaging a corresponding profile of the channels 66 and 68 thereby to ensure a precise location and registration of the trolley structure 42 in relation to the first and second rails 36 and 38.

As previously suggested, the support arm 54 will normally retain an article, such as a monitor or other computer component, to what can be considered the ventral side of the trolley structure 42. As a result, the trolley structure 42 will likely be subjected to a torsion that will tend to press an upper portion of the trolley structure 42 in a ventral direction while pressing a lower portion of the trolley structure 42 in a dorsal direction. To accommodate such a torque most smoothly and effectively, as FIG. 9A shows in relation to the second wing portion 48, the wing portions 46 and 48 of the trolley structure 42 can have first and second primary load bearing wheel structures 64A disposed to the ventral side of the wing portions 46 and 48 adjacent to the upper ends thereof and first and second primary load bearing wheel structures 64A disposed to the dorsal side of the wing portions 46 and 48 adjacent to the lower ends thereof. To maintain the stability of the trolley structure 42 in the event of an opposite torque, such as might occur where a lifting force is applied thereto, a stabilizing wheel structure 64B can be disposed to the dorsal side of the wing portions 46 and 48 adjacent to the upper ends thereof and to the ventral side of the wing portions 46 and 48 adjacent to the lower ends thereof.

Support for the trolley structure 42 and the article retained thereby can be provided by one or more constant force springs 78 and 80. In this embodiment, each constant force spring 78 and 80 is rotatably retained relative to the spine member 40 by an axle 84 with a first end coupled to the spine member 40 and a second end retained relative to a longitudinal fin 82 that projects inboard from the side plate 58 of the rail 36 or 38. The axles 84 are separated by a width distance $W_2$. The constant force springs 78 and 80 are shown apart in FIG. 16. Each constant force spring 78 and 80 has a distal end fixed to the trolley structure 42, such as to the alcove portion 52 thereof, by any appropriate means, such as a mechanical fastener 86, welding, or any other mechanism.

Figure 16:
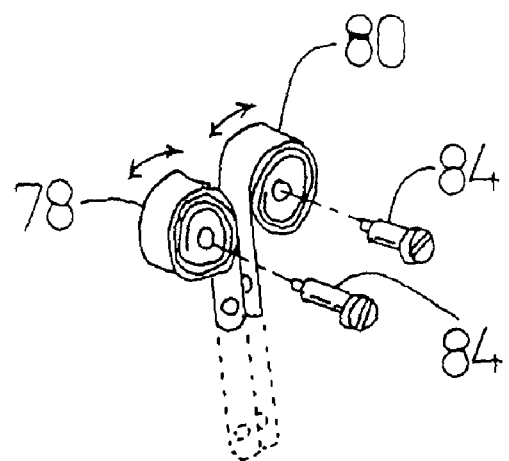
FIG. 16 is a perspective view of constant force springs for use in an extension and retraction arrangement.

As shown in FIG. 16, the constant force springs 78 and 80 can comprise tightly coiled wound spring steel with built in curvature. Each turn of the springs 78 and 80 can wrap tightly around the next inner turn. As the springs 78 and 80 are extended, such as when the trolley 40 and monitor 12 are lowered, an inherent stress in the springs 78 and 80 resists the load at a constant rate thereby ensuring a substantially constant force output. The constant force springs 78 and 80 can be selected to match with the weight of the monitor 12 to be supported. The constant force springs 78 and 80 can be calibrated to counterbalance the combined weight of the trolley 40, support arm 54, and the monitor 12 in an essentially equipoise situation, with a net lifting force thereby to tend to raise the monitor 12 automatically, or with a net extensive force thereby tending to lower the monitor 12 automatically. Of course, other types and numbers of springs, including compression springs, extension springs, and other types of springs, can be used within the scope of the invention.

Embodiments of the invention can additionally incorporate a means for providing a braking and cushioning effect at either or both ends of travel of the trolley 40 and the monitor 12. One such means in depicted in FIGS. 7 and 8 and then alone in FIG. 14 where just a portion of the spine 40 is shown. There, an arcuate braking member 148 has a first end fixed, such as in relation to the spine 40, and a free body portion. A braking screw 150 is threadedly engaged with the spine 40 to underlie the braking member 148. With this, the braking member 148 will frictionally engage the trolley structure 42 thereby to slow and control its travel and, possibly, to prevent an inadvertent lowering of the monitor 12. The degree of braking provided by the braking member 148 can be adjusted by a rotation of the braking screw 150.

Other braking means are possible pursuant to the invention. For example, an alternative braking arrangement is shown in FIG. 15. There, a compression spring 152 is retained within a spring housing 154, which can be formed within or coupled to the spine 40. A projection 156 from the trolley structure 42 can project into the spring housing 154 to engage the spring 152 to brake and cushion the travel of the trolley structure 42 and the retained monitor 12 or other article. A cap member 158 can be disposed at a distal end of the spring 152 to ensure a positive engagement with the projection 156, and a stop member 168 can project from the spring housing 154 into the open inner volume thereof to prevent excessive extension of the spring 152. The initial deflection of the spring 152 and thus the braking force thereof can be adjusted by an adjustment screw 160 that is rotatably retained relative to an upper portion 162 of the spring housing 154 by a retaining ring 166. The adjustment screw 160 can be threadedly engaged with an adjustment nut 164, which can be separately or integrally formed with the spring housing 154. Under such an arrangement, the spring 152 can provide a cushioning and braking effect as the projection 156 engages the spring 152.

Referring again to FIG. 4, the embodiment of the extension and retraction arrangement 10 depicted therein can be manually operated. The first and second doors 22 and 24 can be spring-loaded. Their opening can be triggered by any appropriate method, such as by a pressing thereon or by operation of a switch, such as the trigger 88 or by a remote control (not shown in this drawing). The trolley structure 42 and the article retained thereby, such as a computer monitor, can automatically extend when the doors 22 and 24 are opened. When the article is to be returned to a storage configuration, a user can simply push the article downward to cause the trolley structure 42 to slide longitudinally along the rails 36 and 38.

Figure 7:
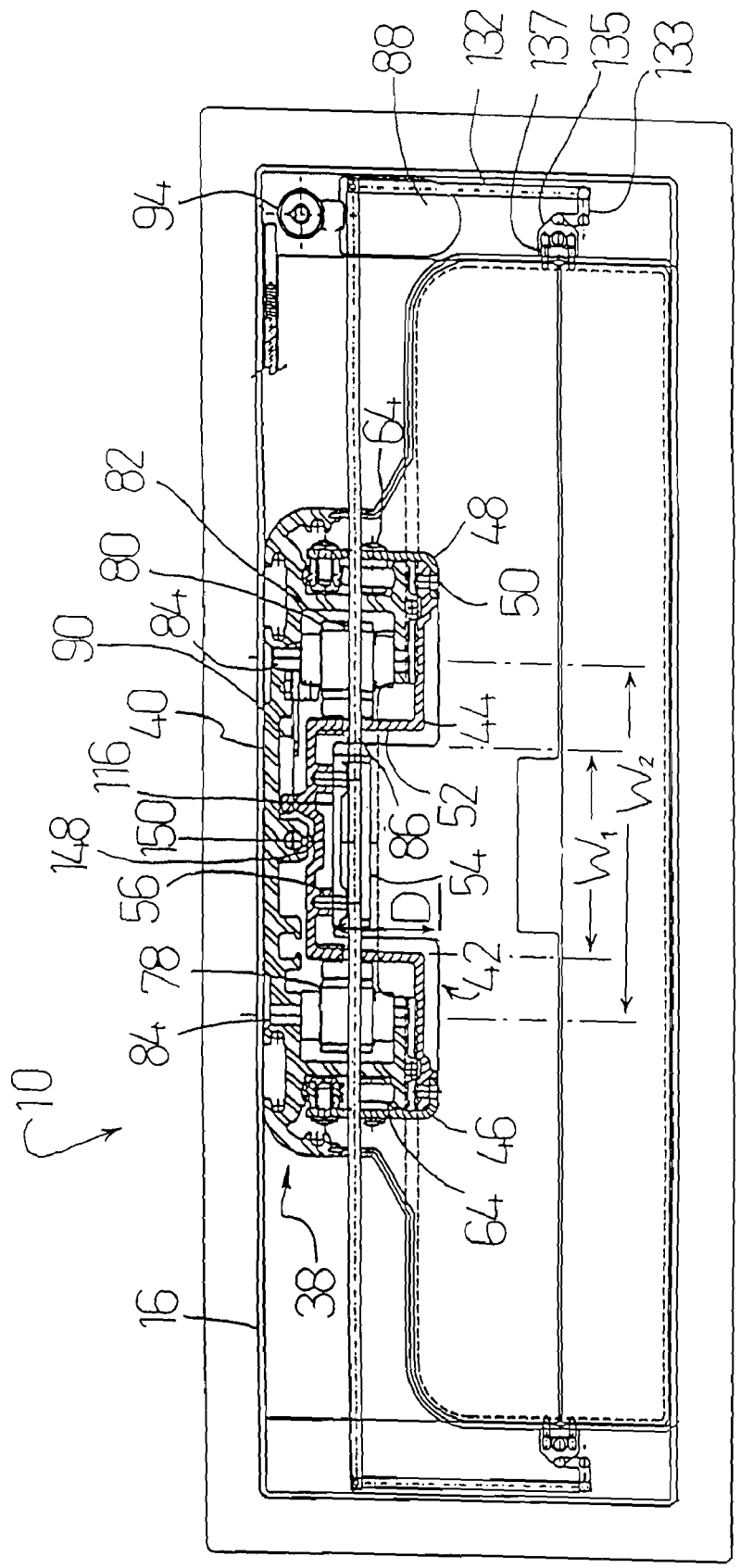
FIG. 7 is a cross sectional view of an extension and retraction arrangement pursuant to the invention disclosed herein.
Figure 8:
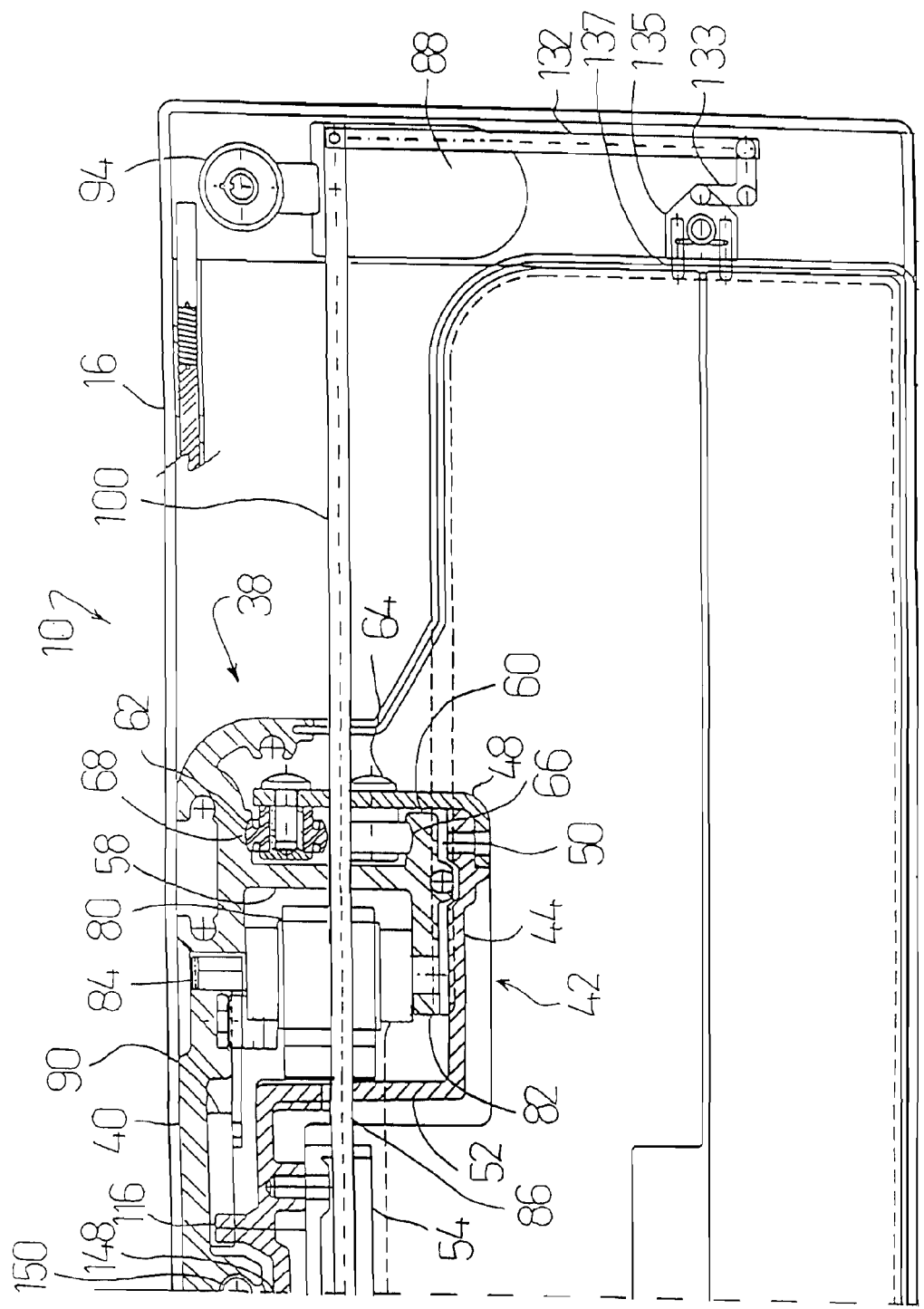
FIG. 8 is a magnified cross sectional view of the extension and retraction arrangement of FIG. 7.
Figure 10:
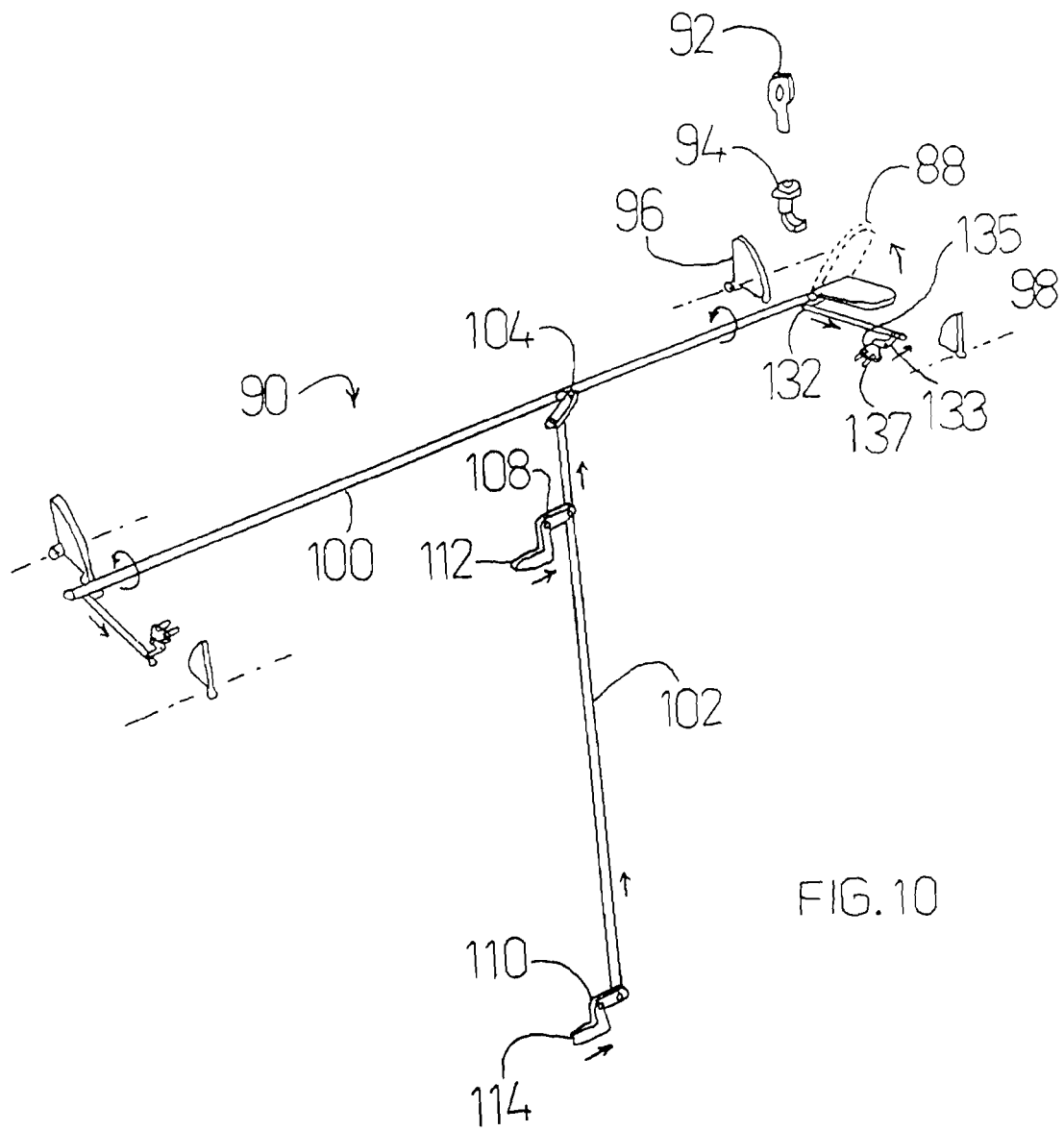
FIG. 10 is a perspective view of a manual actuation arrangement.

The operation and movement of the large and small doors 22 and 24 and the trolley structure 42 can be controlled by a manual actuating arrangement 90, which can be understood with combined reference to FIGS. 7, 8, and 10. The manual actuating arrangement 90 can be controlled by the trigger 88. More particularly, a lateral axle 100 can be rotated by a pivoting of the trigger 88. An actuating rod 132 can have a first end coupled to the lateral axle 100 and a second end coupled to a first leg of a pivotally retained L-shaped actuator 133. An engaging member 135 with locking tips 137 projecting therefrom can be pivotally coupled to a second leg of the L-shaped actuator 133. The large and small doors 22 and 24 can have spring-loaded disc portions 96 and 98 operably associated therewith, such as at each end thereof. With this, a sufficient turning of the lateral axle 100 will disengage the locking tips 137 from the first and second doors 22 and 24 thereby allowing the doors 22 and 24 to open. Each door 22 and 24 can have a frictional damper associated therewith to ensure a smooth opening process.

Additionally, a vertical locking rod 102 can be coupled to the lateral axle 100 by a pivot rod 104 such that the vertical locking rod 102 can be reciprocated upwardly and downwardly by a rotation of the lateral axle 100. The vertical locking rod 102 can have a pivotally retained proximal L-shaped actuator 108 with an engaging tip 112 proximally coupled thereto and a pivotally retained distal L-shaped actuator 110 with an engaging tip 114 distally coupled thereto. Also, looking again to FIGS. 7 and 8, the trolley structure 42 can have a locking projection 116 projecting dorsally therefrom.

The trolley structure 42 can be selectively locked in a retracted configuration by an engagement of the engaging tip 114 of the distal L-shaped actuator 110 with the locking projection 116. Similarly, the trolley structure 42 can be selectively locked in an extended configuration by an engagement of the engaging tip 112 of the proximal L-shaped actuator 108 with the locking projection 116. The trolley structure 42 can be released from each position by a simple actuation of the trigger 88 to cause the respective tip 112 or 114 to pivot out of engagement with the locking projection 116. The lock 94, which can be operated by a key 92 or any other effective arrangement, can selectively prevent operation of the trigger 88.

Use of an embodiment of a non-motorized extension and retraction arrangement 10 as in FIG. 4 with a manual actuation arrangement 90 as in FIG. 10 can be initiated by a pivoting or other actuation of the trigger 88. With a sufficient pivoting of the trigger 88, the actuating rod 132 can induce a pivoting of the L-shaped actuator 133 thereby to release the first and second doors 22 and 24 as the locking tips 137 are drawn out of engagement therewith. The spring-loaded disc portions 96 and 98 can then smoothly pivot the first and second doors 22 and 24 to an open configuration. Simultaneously, the rotation of the lateral axle 100 can produce a vertical displacement of the vertical locking rod 102 thereby to pivot the engaging tip 114 of the distal L-shaped member 110 out of engagement with the locking projection 116 of the trolley structure 42. The trolley structure 42 is thus released from its retracted position.

Where the constant force springs 78 and 80 are calibrated to produce a net lifting force, the trolley 40, support arm 54, and the monitor 12 can then automatically rise to an extended position as in FIG. 1. The means for providing a braking and cushioning effect, whether in the form of an arcuate braking member 148, a compression spring 152, or any other form, can enable a smooth and controlled stopping of the travel of the trolley structure 42 and the retained monitor 12 or other article. The engaging tip 112 of the proximal L-shaped actuator 108 can then engage the locking projection 116 of the trolley structure 42 thereby locking the monitor 12 and the trolley structure 42 in an extended configuration.

The first and second doors 22 and 24 can then be adjusted to a closed configuration as in FIG. 1 to prevent debris from passing through the aperture 15 in the support structure 500 and to achieve a finished appearance. It will be noted that providing first and second doors 22 and 24 as compared to just a single door can be considered to be advantageous for a number of reasons. For example, with first and second doors 22 and 24, the monitor 12, and consequently the support arm 54 and the trolley 42, can be raised to a reduced height to gain clearance relative to the doors 22 and 24 than would be required if just a single door were provided. Since the height to which the monitor 12 must be raised directly affects the required length of the first and second rails 36 and 38 and the subsurface enclosure in general 16, the provision of first and second doors 22 and 24 enables the extension and retraction arrangement 10 to be rendered more efficient and compact. Furthermore, the first and second doors 22 and 24 enable the arm aperture 25, and thus the support arm 54, to be centrally disposed in relation to the aperture 15 and the extension and retraction arrangement 10.

When the monitor 12 is to be lowered, the trigger 88 can again be actuated to reopen the doors 22 and 24 and to release the engaging tip 112 of the proximal L-shaped actuator 108. The monitor 12, support arm 54, and the trolley structure 42 can be pressed to a retracted position and locked there by the engaging tip 114 of the distal L-shaped actuator 110. The doors 22 and 24 can be pressed closed and retained there by an engagement with the locking tips 137.

A variation of the manual actuation arrangement 90 is shown in FIG. 12. There, engaging tips 112 and 114 are again provided for selectively engaging and retaining the locking projection 116 of the trolley structure 42. However, the L-shaped actuators 108 and 110 instead comprise rotatably retained disc-shaped actuators 108 and 110. Furthermore, a pivot gearing arrangement 106 is instead employed to induce a reciprocation of the vertical locking rod 102 in response to an actuation of the trigger 88.

Figure 5:
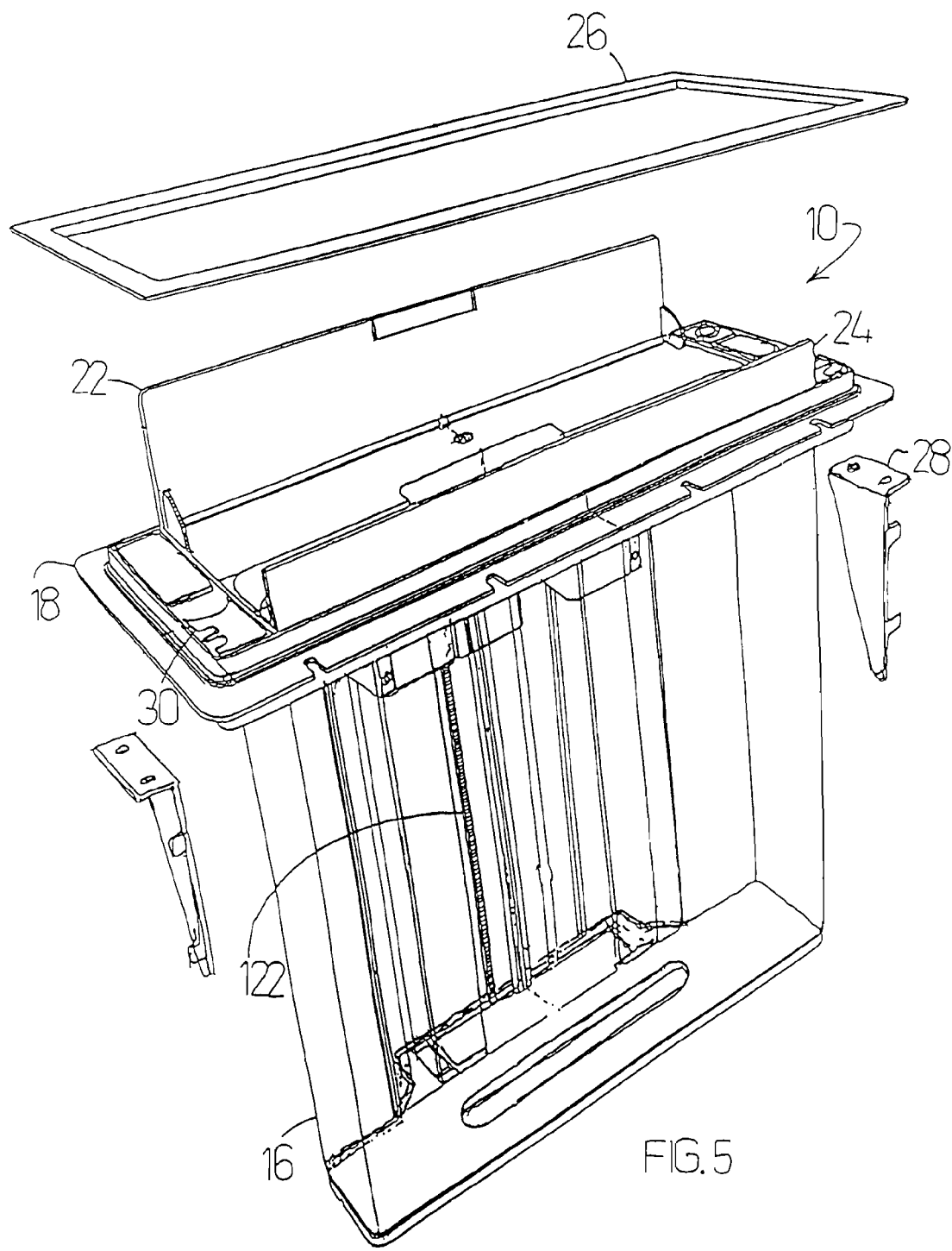
FIG. 5 is a perspective view of a further extension and retraction arrangement pursuant to the present invention.
Figure 6:
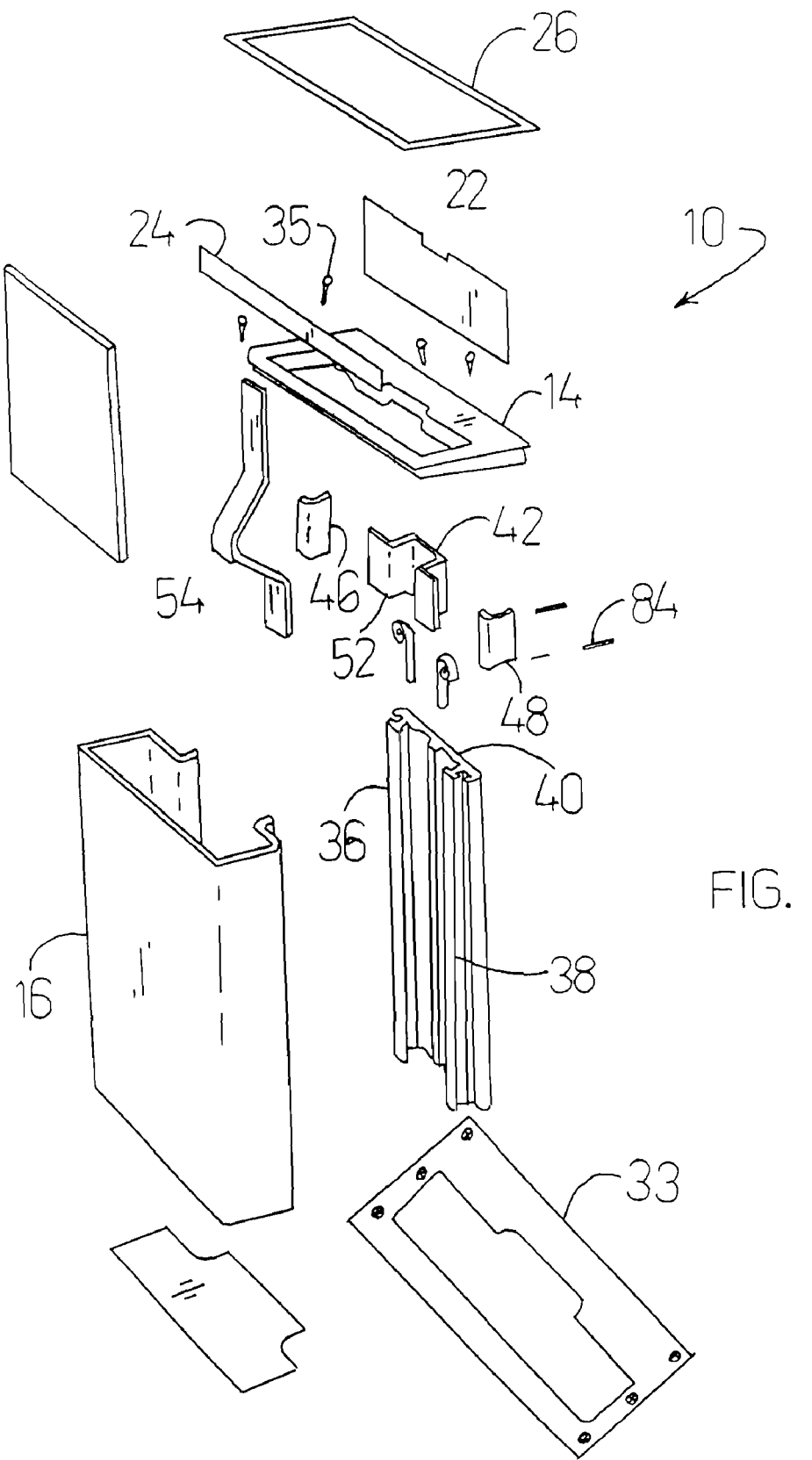
FIG. 6 is an exploded perspective view of an extension and refraction arrangement under the instant invention.
Figure 11:
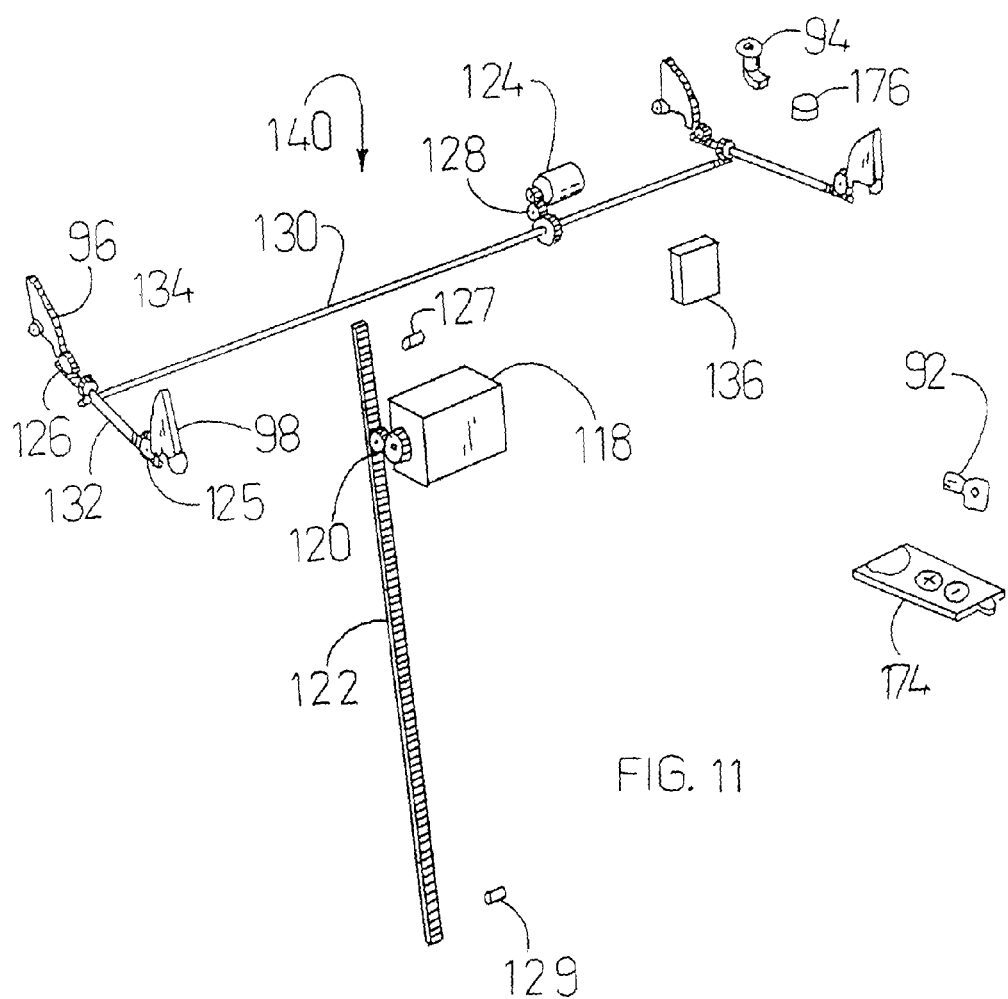
FIG. 11 is a perspective view of a motorized actuation arrangement.

As the embodiment of FIG. 5 makes clear, the extension and refraction arrangement 10 can alternatively be motorized. An example of a motorized drive and actuating arrangement 140 is shown in FIG. 11. A drive motor 118 can be fixed relative to the trolley structure while a rack gear 122 can be fixed relative to the spine 40 and the first and second rails 36 and 38 shown, for example, in FIG. 7. A pinion gearing arrangement 120 can drivingly engage the drive motor 118 with the rack gear 122. A secondary motor 124 can be drivingly associated with a lateral rod 130 by a gearing arrangement 128. The lateral rod 130 can in turn be drivingly engaged with door driving rods 132 by a worm gear arrangement 134. The door driving rods 132 can engage the first door 22 by a gear arrangement 126 between the door driving rods 132 and geared disc portions 96 of the first door 22. Similarly, the door driving rods 132 can engage the second door 24 by a gear arrangement 125 between the door driving rods 132 and geared disc portions 98 of the second door 24. Constant force springs 78 and 80 as shown in FIG. 7 may or may not be included to provide a counterbalancing force in relation to the trolley structure 42, the monitor 12, and the support arm 54.

A lock 94 and key 92 combination can enable access and control of the extension and retraction arrangement 10. Alternatively or additionally, as shown in relation to the alternative embodiment of FIG. 17, access and control of the extension and retraction arrangement 10 could be controlled by a card reader 172 in combination with an access card 170. The access card 170 could be of any suitable type including, by way of example, a dedicated security card, an identification card, a credit card, a purchased card, or any other type of access card 170. Still further, access and control could be had by operation of a remote control unit 174 in combination with a receiver 176 as is also shown in FIG. 11.

Actuation of the motorized drive and actuating arrangement 140 of FIG. 11 can induce the secondary or door motor 124 into operation thereby to rotate the lateral rod 130 with a resultant rotation of the door driving rods 132 and an opening of the doors 22 and 24 as the disc portions 96 and 98 are driven by the gearing arrangements 126 and 125. Simultaneously with, before, or after, the opening of the doors 22 and 24, the drive motor 118 can be induced into operation thereby to cause it, the trolley structure 42, and the retained monitor 12 to climb the rack gear 122 until an extended disposition is reached as may be sensed by an upper limit switch 127 or other means. The first and second doors 22 and 24 can then be closed by the secondary motor 124.

When the monitor 12 or other article is to be retracted, the lock 94 and key 92, the card reader 172 and access card 170, the trigger 88, the remote control unit 174 and receiver 176, or any other means can be employed to induce the secondary motor 124 into operation to open the doors 22 and 24. The drive motor 118 can then be actuated to propel the trolley structure 42, the monitor 12, and the support arm 54 to a retracted configuration. The doors 22 and 24 can then be closed by operation of the secondary motor. Of course, one skilled in the art would find it readily obvious and within the scope of the invention to employ a single motor or more than two motors for opening the doors 22 and 24 and raising and lowering the trolley structure 42.

Figure 18:
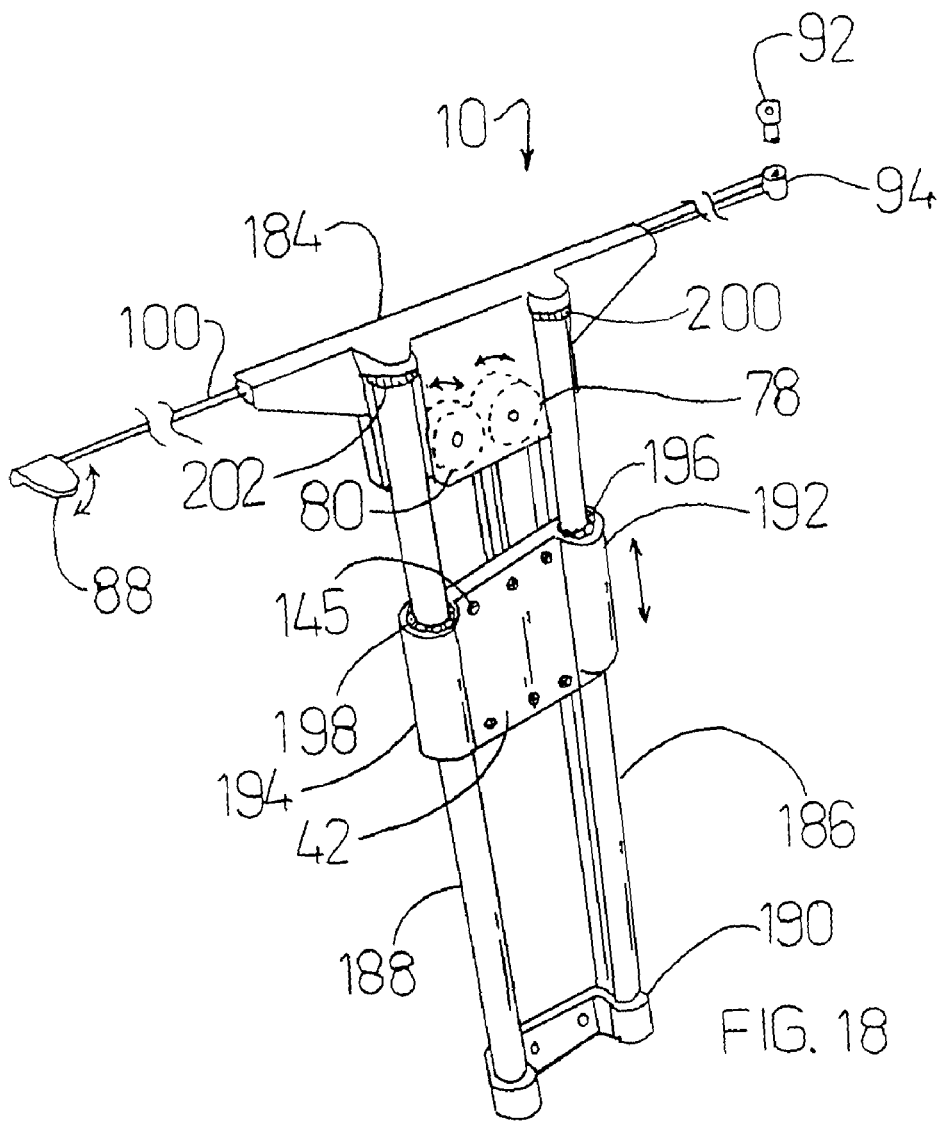
FIG. 18 is a perspective view of another alternative extension and retraction arrangement.

An alternative extension and retraction arrangement is again indicated at 10 in FIG. 18. The extension and retraction arrangement 10 has a support base 184 relative to which a pair of cylindrical support rods 186 and 188 are mounted in parallel spaced orientation relative to one another. Distal ends of the cylindrical support rods 186 and 188 are mounted on a lower support bracket 190. A trolley structure 42 is slidably engaged with the support rods 186 and 188.

The trolley structure 42 in this embodiment includes opposing bushings 192 and 194 that slide along the support rods 186 and 188. Bearings 196, 198 provide smooth gliding engagement between the bushings 192 and 194 and the support rods 186 and 188. Threaded mounting holes 145 are again formed in the trolley structure 42 in accordance with the Video Electronics Standards Association Flat Display Mounting Standard for flat panel monitors. Constant force springs 78 and 80 are rotatably retained relative to the support base 184 and have distal ends connected to the trolley structure 42.

To prevent damage to the monitor 12 as it reaches an extended position, rubber o-rings 200 and 202 mounted on the upper or proximal ends of the support rods 186 and 188 provide shock absorption for the trolley structure 42. A lock 94 and key 92 combination or other means can control access and operation of the extension and retraction arrangement 10 to prevent unauthorized access to the monitor 12 or other supported article. The lock 94 can prevent rotation of the lateral axle 100 until the key 92 or other means is actuated.

Figure 17:
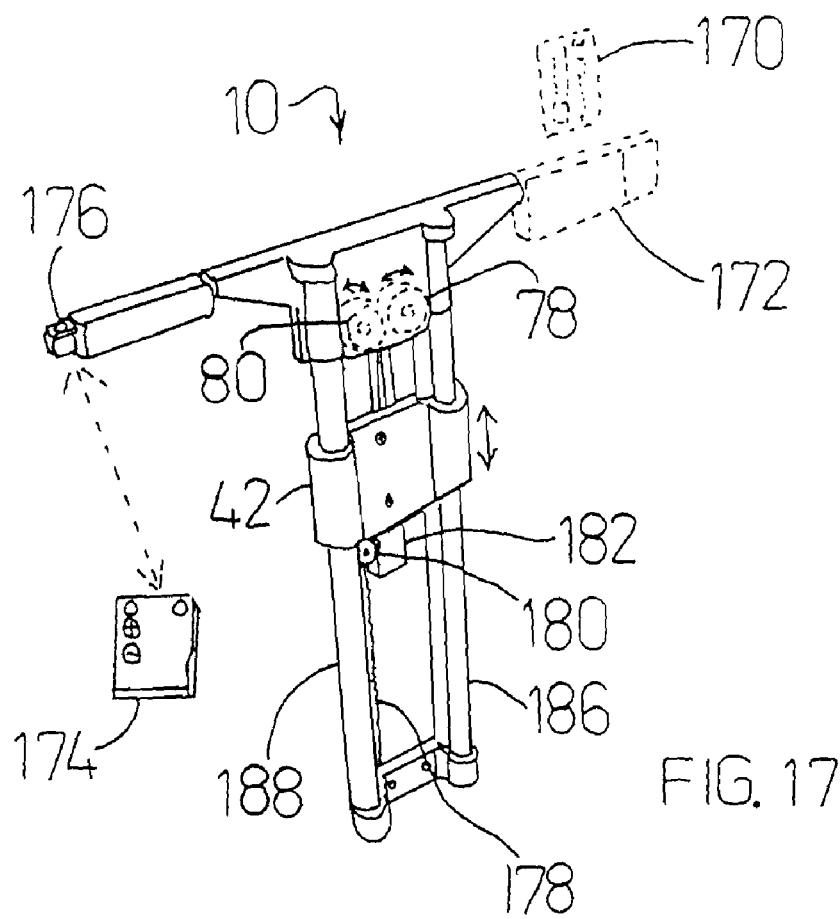
FIG. 17 is a perspective view of an alternative extension and retraction arrangement.

As shown in FIG. 17, the raising and lowering of the trolley structure 42 can be driven by a motor 182 that drives a pinion gear 180 along a rack gear 178. The rack gear 178 can be disposed along a support rod 188 or otherwise disposed, such as along a subsurface enclosure (not shown). As previously described, access and control can additionally be controlled by a card reader 172 and access card 170 and, additionally or alternatively, a remote control unit 174 and receiver 176. Such an extension and retraction arrangement 10 can be employed with or without constant force springs 78 and 80.

Figure 19:
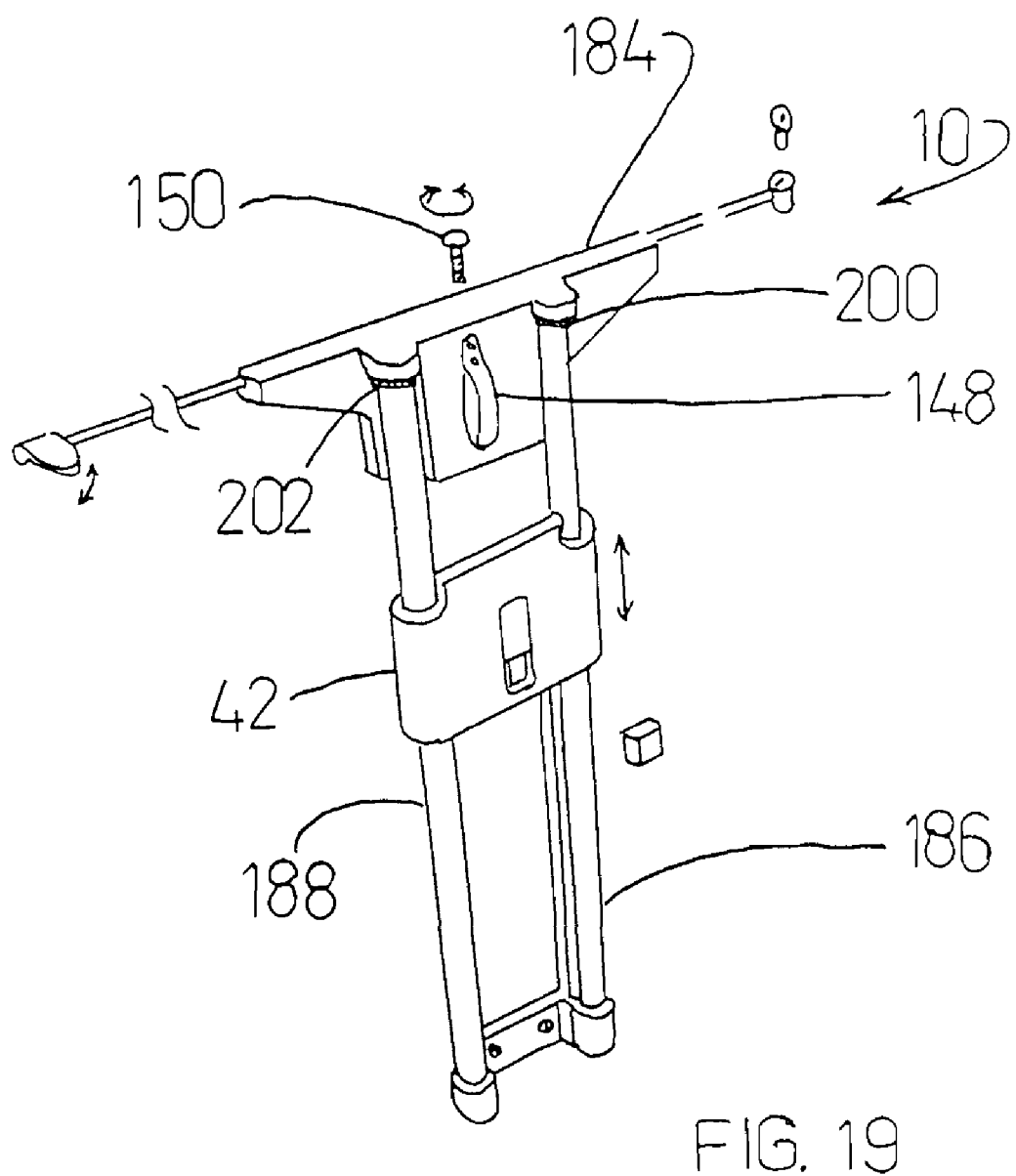
FIG. 19 is a perspective view of still another extension and retraction arrangement under the present invention.

With reference to FIG. 19, one sees that a braking arrangement can again be provided. The braking arrangement can again include an arcuate braking member 148 and a braking screw 150 for adjusting the braking force to be applied. The braking member 148 can have a first end fixed in relation to the support base 184 and a free body portion.

Extension and retraction arrangements 10 can be supplied with a support structure 500, such as the desk in FIGS. 1 through 3, as original equipment. Alternatively, extension and retraction arrangements 10 can be supplied in retrofit kit form. As one can perceive from FIG. 6, such a kit could include the extension and retraction arrangement 10, mounting fasteners 35, and a template 33 for cutting an aperture 15 in a support structure 500 in which it is to be installed. With an extension and retraction arrangement 10 installed in relation to a support structure, whether before or after sale to the ultimate consumer, a monitor 12 can be readily mounted to the support arm 54. The support structure 500, the extension and retraction arrangement 10, and the monitor 12 can be sold integrated together. Alternatively, the monitor 12 and an extension and refraction arrangement 10 can be sold as a package.

Figure 20:
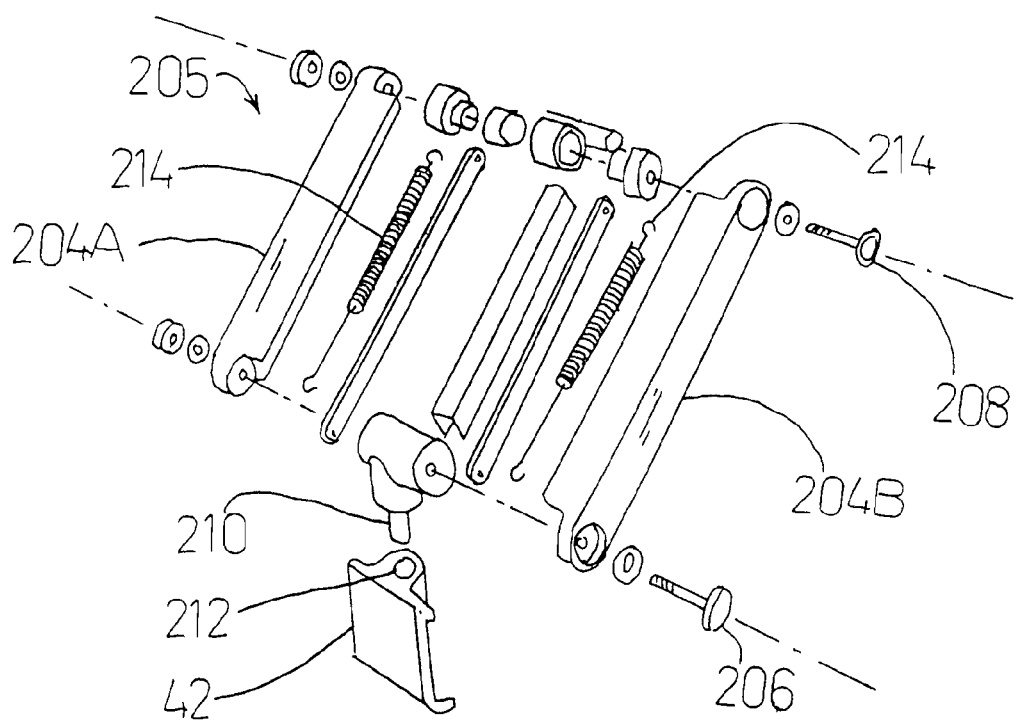
FIG. 20 is an exploded perspective view of an adjustable arm for use pursuant to the invention.
Figure 21:
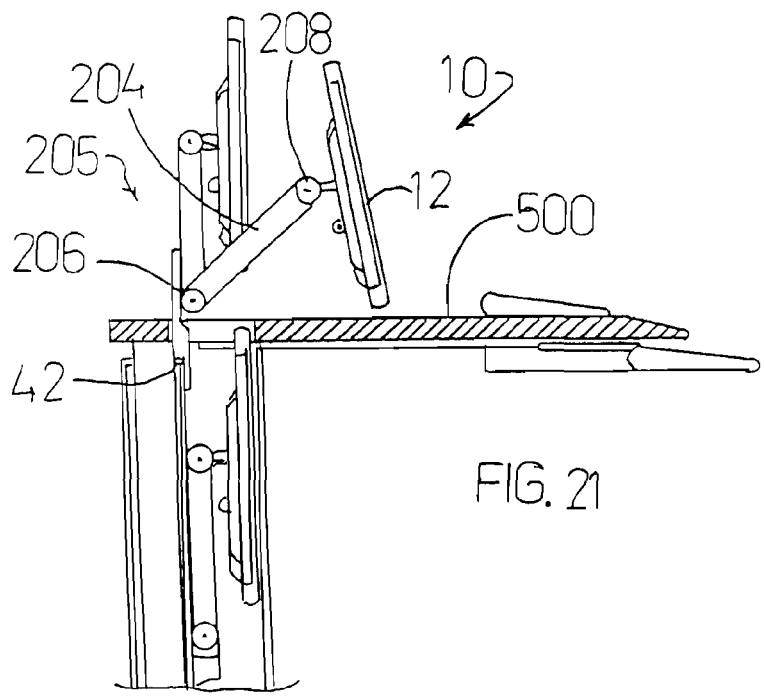
FIG. 21 is a cross sectioned view in side elevation of an extension and retraction arrangement employing the adjustable arm of FIG. 20.

With reference to FIGS. 20 and 21, an extension and retraction arrangement 10 is depicted that not only extends and retracts an article, such as a monitor 12, but also enables an adjustment of the position, orientation, and location of the monitor 12 by use of a spring balanced arm arrangement 205. The spring balanced arm arrangement 205 can have an arm 204 that can be pivotally coupled to the trolley structure 42 at a proximal pivot axis 206. The monitor 12 can be pivotally coupled to the arm 204 at a distal pivot axis 208. The arm 204 can include first and second arm portions 204A and 204B and can be balanced by one or more springs 214. Additionally, the arm 204 can rotate about a vertical axis relative to the support structure 500 by a rotation of a pivot rod 210 that projects from the proximal pivot axis 206 and is received into a pivot aperture 212 in the trolley structure 42.

Figure 22:
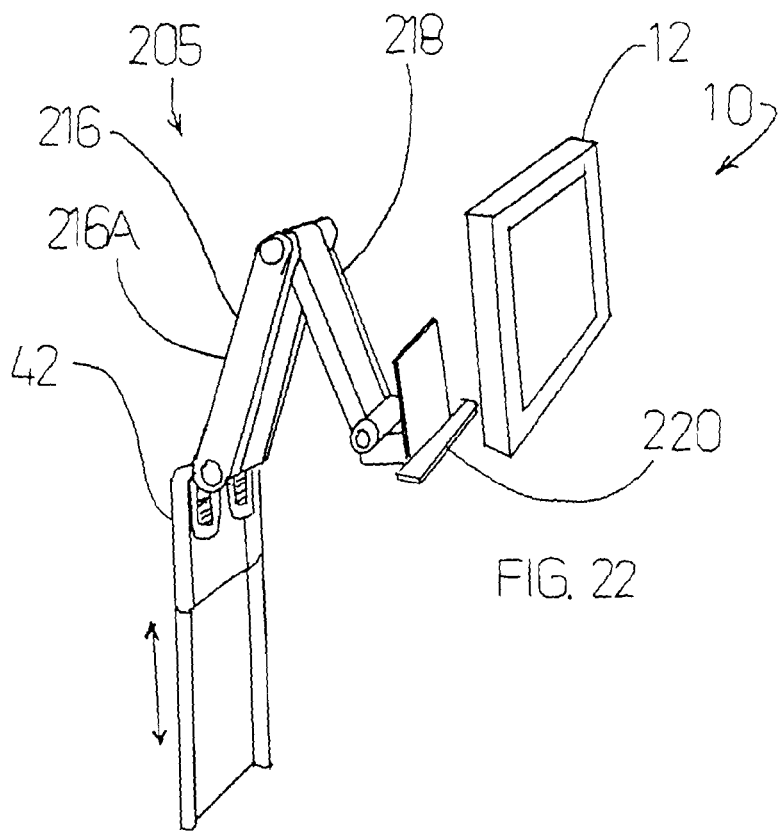
FIG. 22 is a perspective view of an extension and retraction arrangement employing an alternative articulated arm.

In FIG. 22, the spring balanced arm 205 can be articulated with a first arm 216 pivotally coupled at a proximal end to the trolley structure 42 and a distal end pivotally coupled to a proximal end of a second arm 218. The monitor 12 can be pivotally coupled to the monitor 12 by a monitor mounting bracket 220. The first arm 216 can be formed by spaced first and second arm portions 204A and 204B, and the second arm 218 can be pivoted to be disposed inboard of the first and second arm portions 204A and 204B to enable a most compact storage of the spring balanced arm 205.

Figure 23:
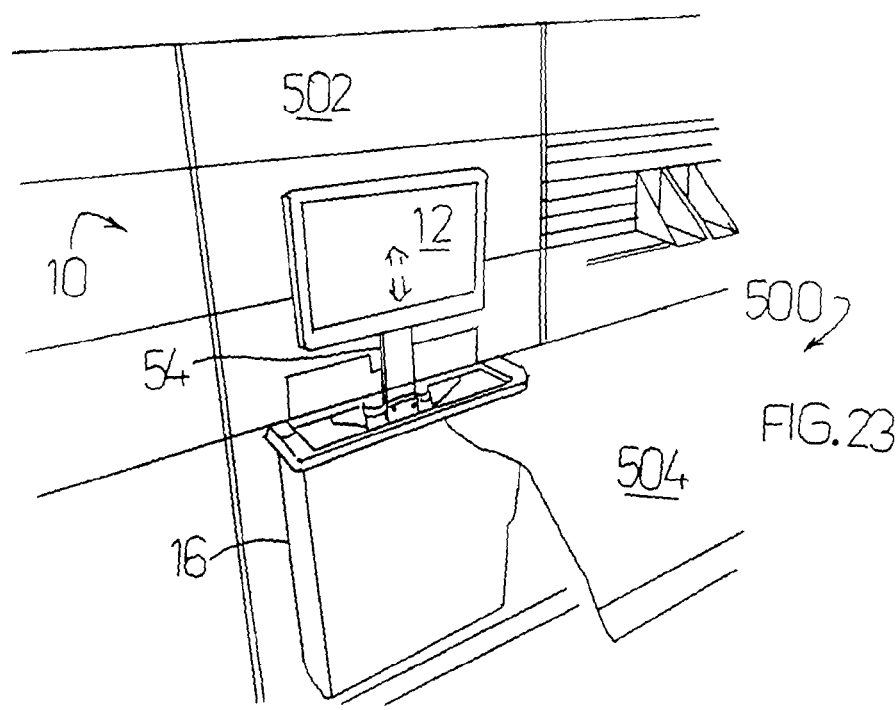
FIG. 23 is a perspective view of an extension and retraction arrangement pursuant to the present invention retained in relation to a slot wall arrangement.

As noted previously, extension and retraction arrangements 10 under the present invention can be employed relative to numerous different types of support structures 500, not only desks. For example, turning to FIG. 23, an extension and refraction arrangement 10 is retained relative to a support structure 500 comprising a slot wall arrangement. The slot wall arrangement can have a wall portion 502 and, possibly, a desk portion 504. The subsurface enclosure 16 and the extension and retraction arrangement 10 in general can be secured relative to a slot 222 in the wall portion 502 to enable the monitor 12 and support arm 54 to be extended from the subsurface enclosure 16, possibly through the desk portion 504. Alternatively, the subsurface enclosure 16 of the extension and retraction arrangement 10 can be disposed within a wall portion 502, which may or may not be a slot wall. In certain cases, for example, the wall portion 502 can comprise a typical office partition wall or any other type of wall.

Figure 24A:
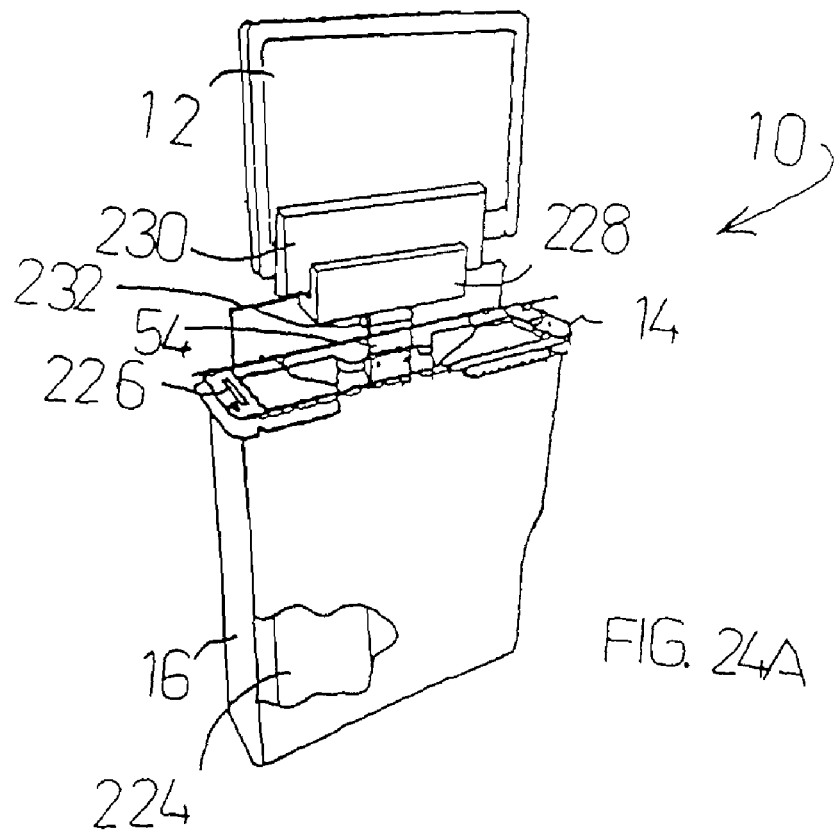
FIGS. 24A and 24B are perspective views of yet another extension and retraction arrangement under the present invention.
Figure 24B:
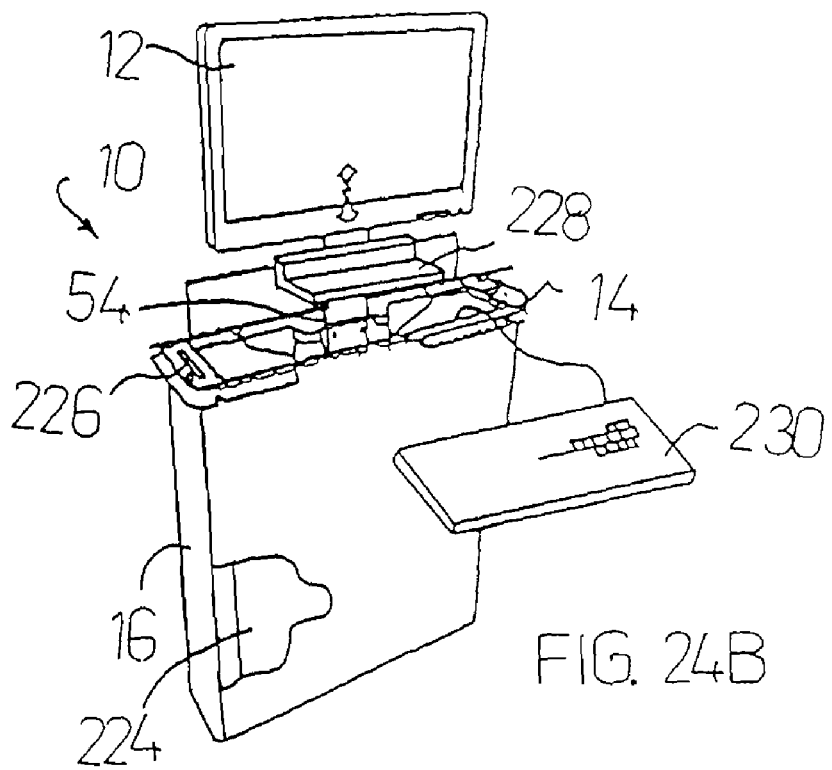

Yet another embodiment of the extension and retraction arrangement 10 is depicted in FIGS. 24A and 24B. There, a computer central processing unit 224 is retained within the subsurface enclosure 16 for interaction with the monitor 12, a keyboard 230, and any further computer components that may be required. Furthermore, one or more computer drive units 226 can be incorporated into the extension and retraction arrangement 10, such as in relation to the upper framework 14 as in FIGS. 24A and 24B. With this, the extension and retraction arrangement 10 could house or essentially comprise a self-enclosed computer system.

In certain practices of the invention, a keyboard 230 can additionally or alternatively be retained for extension and refraction. As shown in FIGS. 24A and 24B, for example, a keyboard 230 can be retained relative to the support arm 54, and thus relative to the trolley structure 42 (not shown in FIGS. 24A and 24B) by a keyboard cradle 228. The keyboard cradle 228 could be fixed in relation to the support arm 54 or pivotable by use of a pivot arrangement 232. The keyboard 230 can be used while retained in relation to the keyboard cradle 228, or it can be removable as in FIG. 24B.

Figure 25:
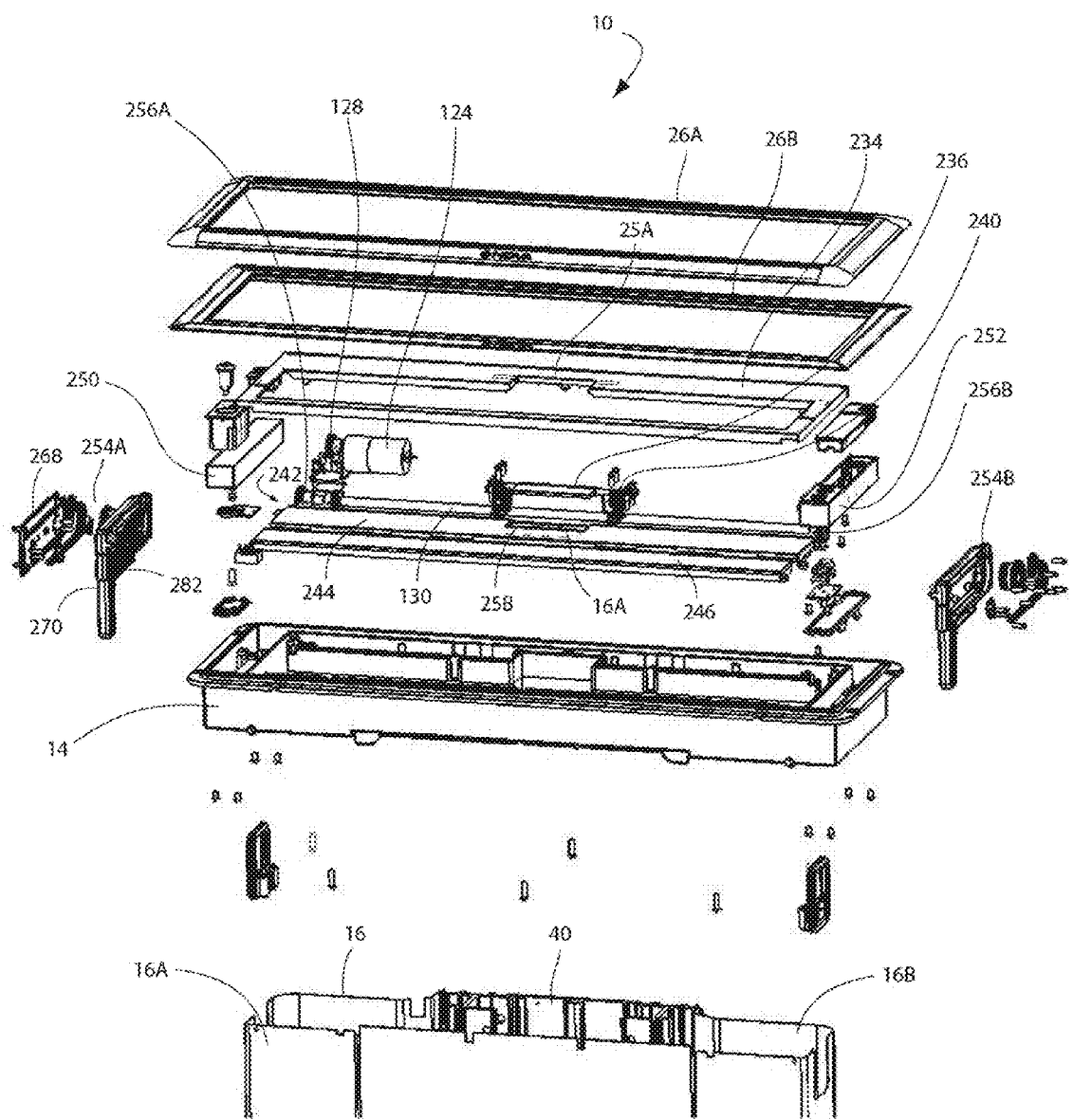
FIG. 25 is an exploded perspective view of an upper portion of another extension and retraction arrangement pursuant to the present invention.
Figure 26:
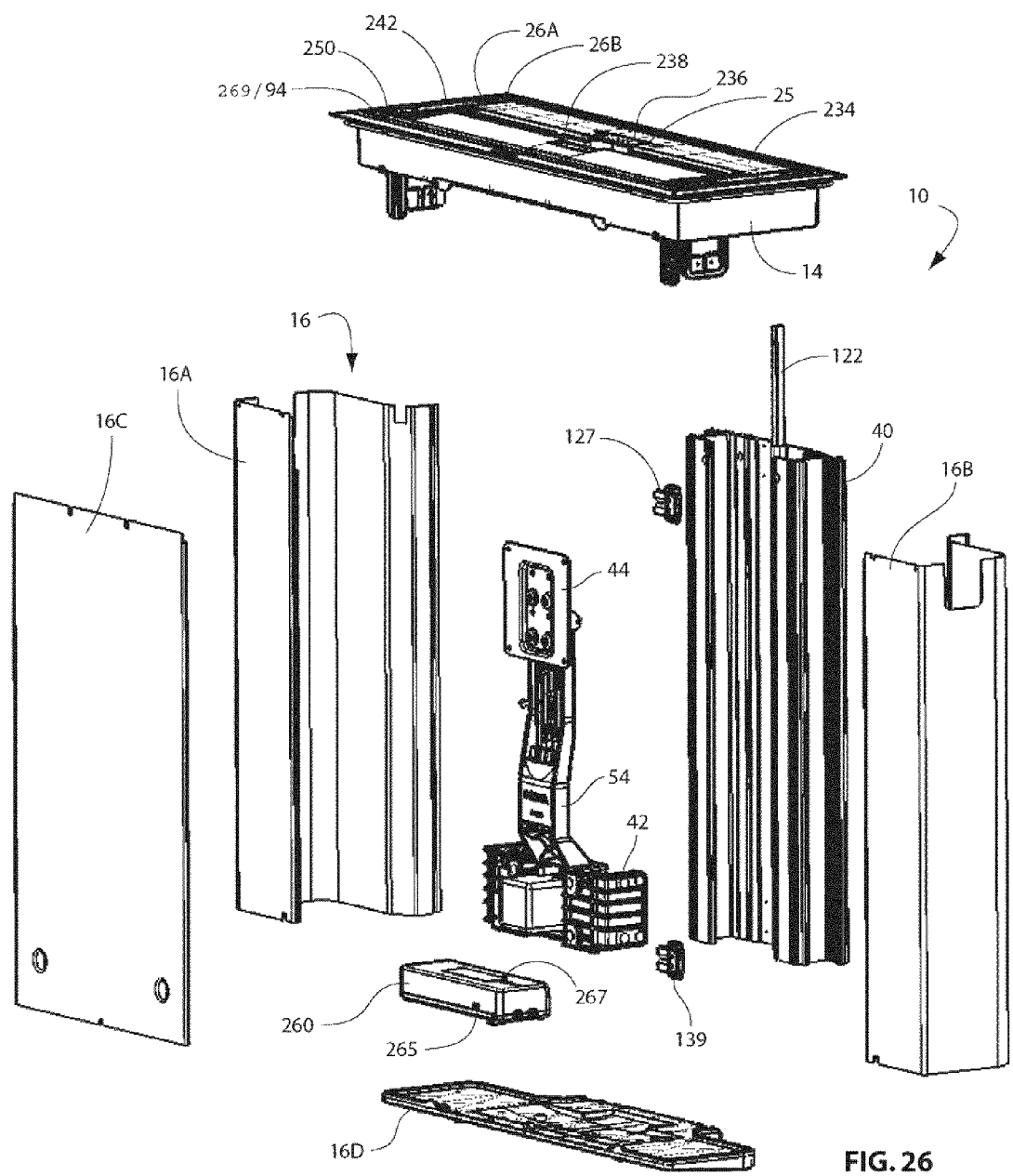
FIG. 26 is a partially exploded view of the extension and retraction arrangement of FIG. 25 depicted with upper and lower limit sensors.

A further refined embodiment of an extension and retraction arrangement 10 according to the present invention is depicted in FIGS. 25 and 26 and various subassemblies and components thereof are shown in FIGS. 27 through 33. In FIG. 25, the extension and retraction arrangement 10 can be seen to have an upper flange formed by a modesty cover 26A in combination with a flush mount modesty cover 26B. A rectangular top cover 234 is received within a correspondingly shaped and sized rectangular opening defined by the flush mount modesty cover 26A.

The top cover 234 has a rectangular aperture therein. A centrally disposed, rectangular notch in an inner edge of the top cover 234 to the ventral side thereof forms an arm aperture portion 25A. The arm aperture portion 25A cooperates with a correspondingly disposed arm aperture portion 25B in a central portion of a distal, ventral end of a sliding, articulated door 242. With this, when the articulated door 242 is in a closed position as in FIG. 26, the arm aperture portions 25A and 25B meet to form an arm aperture 25 through which the support arm 54 can be received while the support arm 54 is an extended position.

As shown in FIG. 26, a flipper door 236 and a pocket door 238 cooperate to seal the arm aperture 25 entirely when the support arm 54 and a retained trolley 42 are in a refracted position. As described hereinbelow, the flipper door 236 and the pocket door 238 can pivot to an open position with the flipper door 236 pivoting upwardly and the pocket door 238 pivoting downwardly to open the arm aperture 25 and thereby to permit a receiving of the support arm 54 while the trolley 42 and the support arm 54 are extended.

Figure 27:
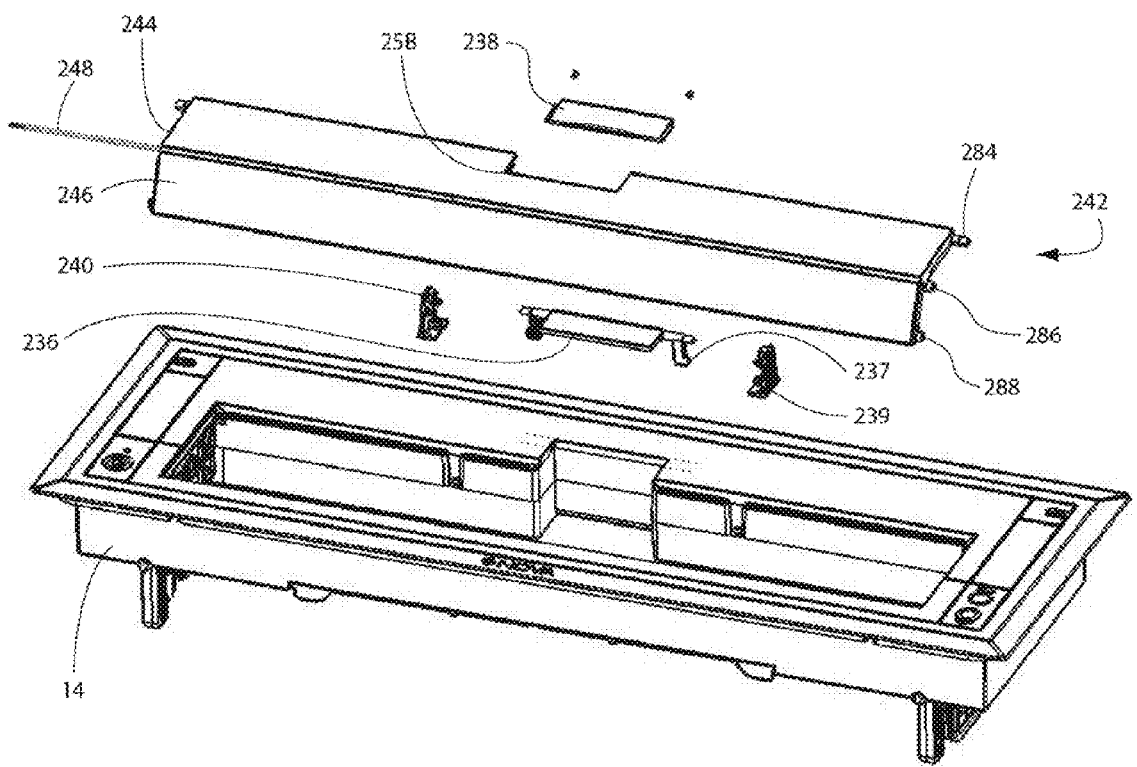
FIG. 27 is an exploded perspective view of an upper framework with a sliding, articulated door according to the invention disclosed herein.

Looking to FIG. 27, the flipper door 236 is pivotally retained by retaining members 240 that are affixed to or integrated within the upper framework 14. More particularly, the flipper door 236 has pivot rods that project outboard from opposed first and second ends thereof. The pivot rods establish an axis of rotation for the flipper door 236 and are received into corresponding apertures in the retaining members 240. The axis of rotation of the flipper door 236 is generally aligned with the edge of the arm aperture portion 25A in the top cover 234. With this, the flipper door 236 closes the arm aperture portion 25A when the flipper door 236 is in a closed disposition.

The flipper door 236 can pivot upwardly, such as when contacted by the tip of the support arm 54, so that the flipper door 236 rests against the support arm 54 when the arm 54 is in a raised position. The flipper door 236 can automatically pivot to a closed position when the support arm 54 retracts. While this automatic pivoting could be accomplished in a number of ways, the present embodiment ensures an automatic pivoting by force of gravity. To facilitate this, flipper arms 237 project radially from the pivot rods 236 angularly spaced therefrom to be disposed below the flipper door 236, more particularly projecting generally vertically downwardly, when the flipper door 236 is disposed in a closed, horizontal disposition generally coplanar with the top cover 234.

Under this arrangement, the flipper arms 237 thus act as an eccentric weight relative to the axis of rotation of the flipper door 236. Stops 239 are fixed to the retaining members 240, such as by being integrally formed therewith, such that the stops 239 are fixed in place relative to the upper framework 14. With this, the flipper door 236 is permitted to pivot until it reaches an orientation generally coplanar with the top cover 234 whereupon the flipper arms 237 contact the stops 239 thereby to prevent further pivoting and to maintain the closed position of the flipper door 236. The flipper door 236 is thus biased to a closed position by the weight of the flipper arms 237 and prevented from pivoting past the closed position by the contacting of the flipper arms 237 with the stops 239.

The pocket door 238 is pivotally retained relative to the articulated door 242 to close the arm aperture portion 25B when in a closed position. The pocket door 238 has an axis of rotation disposed in alignment with the edge of the arm aperture portion 25B whereby the pocket door 238 is generally coplanar with the first door section 244 of the articulated door 242 when the pocket door 238 is in a closed position. The pocket door 238 can pivot downwardly to an open position to allow the support arm 54 to be received in the arm aperture portion 25B. The pocket door 238 can be biased, such as by one or more springs, by eccentric weighting, or by any other means, to a closed position generally coplanar with the first door section 244. The pocket door 238 is prevented from pivoting passed the closed position by having outboard, offset edges that underlie side, offset edges of the arm aperture portion 25B. The complementary offset edges of the pocket door 238 and the arm aperture portion 25B permit the pocket door 238 and the first door section 244 to present a substantially flat surface.

The pocket door 238 and the flipper door 236 can lock in relation to one another when the articulated door 242 is in a closed position. In one example, a distal portion, such as an offset distal edge, of the pocket door 238 can be disposed to overlap a distal portion, such as an offset distal edge, of the flipper door 236 when the articulated door 242 is in a fully closed position. With this, where the flipper door 236 is pivotable upwardly but not downwardly passed a closed position, the pocket door 238 is pivotable downwardly but not upwardly passed a closed position, and the doors 236 and 238 are engaged, the flipper arms 237 of the flipper door 236 will engage the stops 239 to prevent the flipper door 236 from pivoting downwardly, the overlapping edges of the pocket door 238 and the flipper door 236 will prevent the pocket door 238 from pivoting downwardly, and the doors 236 and 238 can present a substantially flat surface. With this, the arm aperture 25 will be effectively sealed when the support arm 54 is disposed in a storage disposition.

Figure 28:
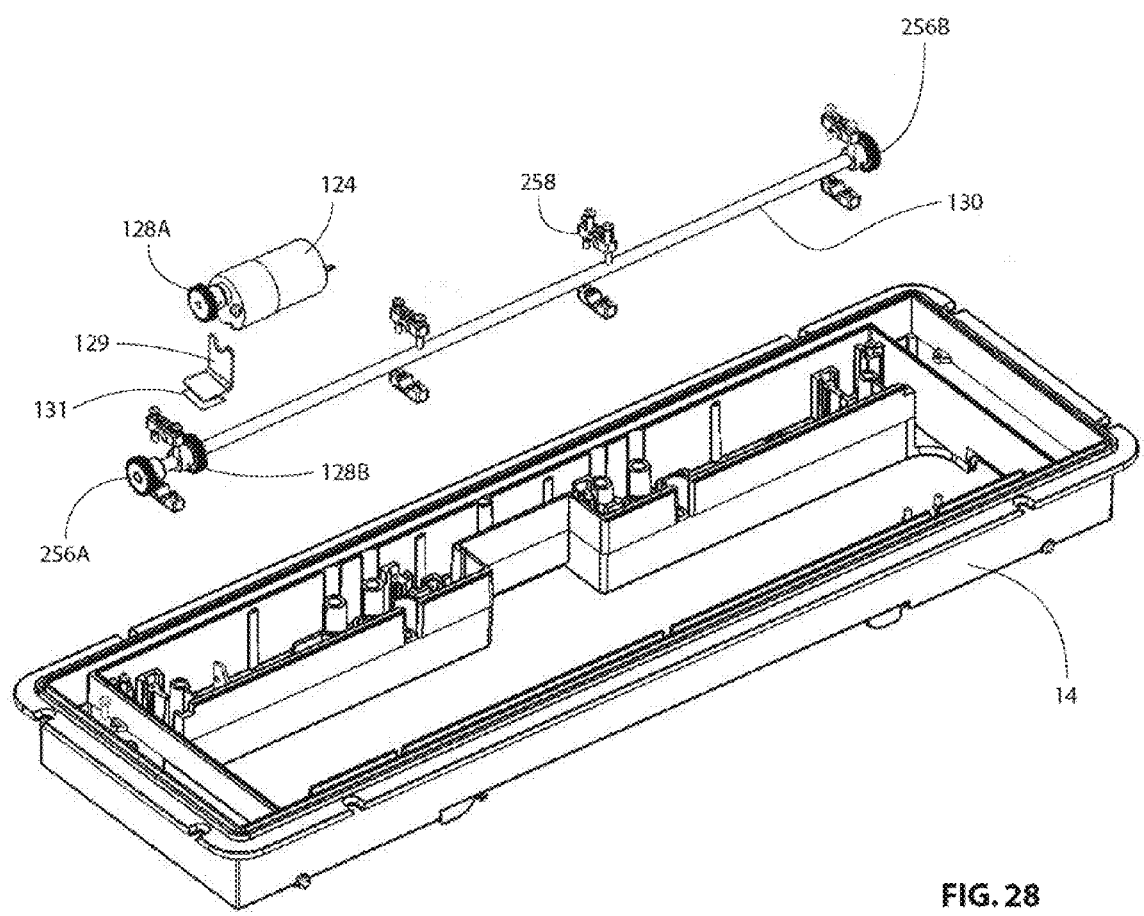
FIG. 28 is an exploded perspective view of an upper framework with a door actuation system as taught herein.
Figure 29:
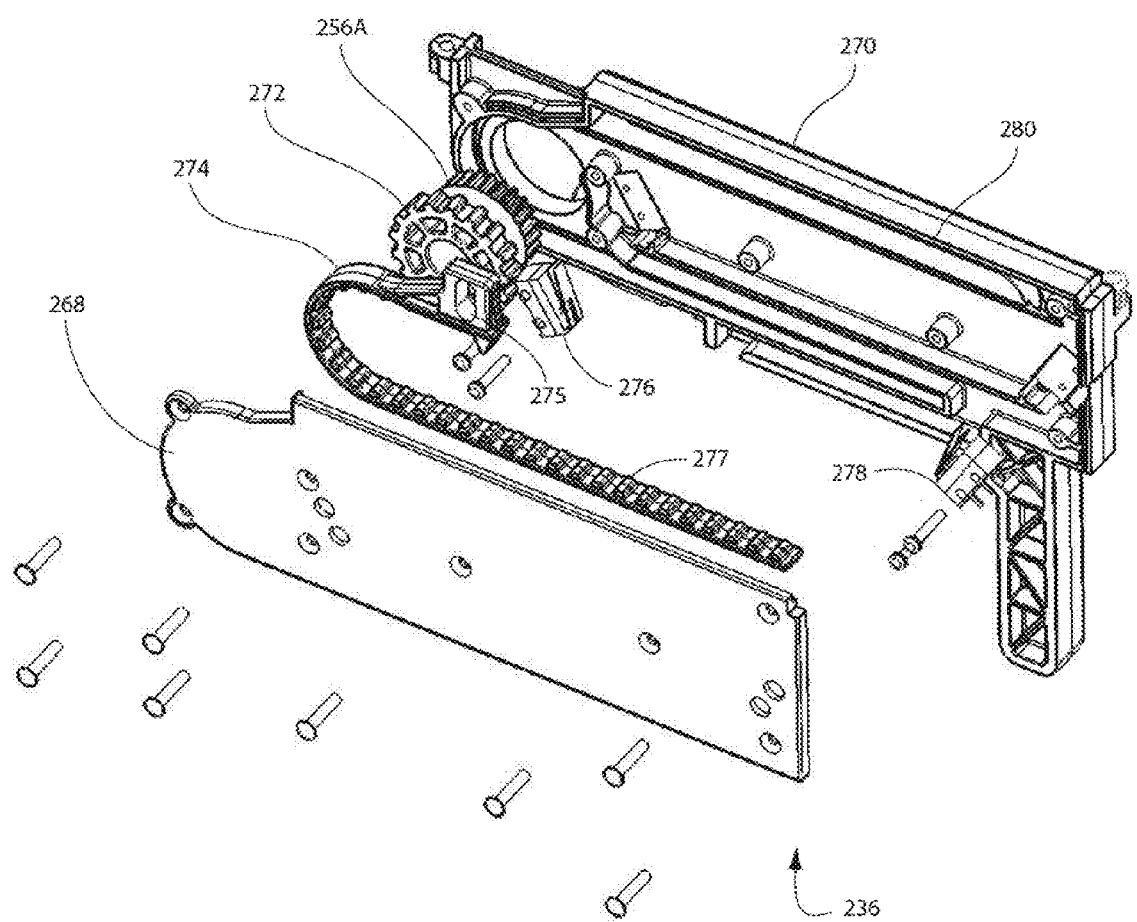
FIG. 29 is an exploded perspective view of a door guidance arrangement operable with the door actuation system of FIG. 28.

The structure and operation of the articulated door 242 can be better understood with additional reference to FIGS. 28 and 29. The articulated door 242 is slidable from the closed position of FIG. 26, to an open position for allowing the extension and retraction of the support arm 54 and the trolley 42, and again to a closed position with the support arm 54 in a raised position received through the arm aperture 25 with the doors 236 and 238 in open dispositions.

The articulated door 242 is formed by multiple sections pivotally coupled along lateral pivot axes that facilitate its sliding extension and retraction between open and closed positions. In the depicted embodiment, the door 242 is formed with first and second sections 244 and 246 that are coupled to pivot along a lateral pivot axis. Of course, it would be possible to form the articulated door 242 with just one section or with more than two sections. The first and second sections 244 and 246 could be coupled by any pivotal coupling means. In this case, the pivotal coupling means comprises a hinge pin 248, but a living hinge or any other means could readily be employed.

The articulated door 242 is propelled and guided by door path subassemblies 254A and 254B respectively disposed to the first and second sides of the articulated door 242. As can be perceived from FIG. 29 where a door path subassembly 254A is shown in an exploded view, each door path subassembly 254A has a door path cover 268 secured to an outboard side of a door path guide member 270 as by fasteners or any other suitable means or combination thereof. The door path guide member 270 has a drive slot 280, which in this embodiment is disposed entirely therethrough. The drive slots 280 of the door path subassemblies 254A and 254B slidably receive distal drive pins 284 that project laterally from opposed sides of the first door section 244 adjacent to the distal edge of the first door section 244.

The first and second door sections 244 and 246 additionally have central and proximal slide pins 286 and 288 projecting laterally outwardly from each side of the door 242 at a midportion and proximal end of the articulated door 242 respectively. The central slide pins 286 project laterally outwardly from adjacent to the proximal edge of the first door section 244, and the proximal slide pins 288 project laterally outwardly from adjacent to the proximal edge of the second door section 246 and thus from the adjacent to the proximal edge of the articulated door 242 in general. It can be seen that the distal drive pins 284 are longer than the central and proximal slide pins 286 and 288. With this, the central and proximal slide pins 286 and 288 can fit between the base panels of the door path guide members 270 while the distal drive pins 284 can project through the drive slots 280 in the door path guide members 270.

To the inboard side of each door path guide member 270 is an arcuate guide surface 282, which can be best seen in FIG. 25. The arcuate guide surfaces 282 provide smooth surfaces over which the slide pins 286 and 288 can travel during movement of the articulated door 242 between open and closed positions. Each arcuate guide surface 282 has a proximal portion disposed generally vertically, a distal portion disposed generally horizontally and parallel to the drive slot 280, and an arcuate portion connecting the proximal and distal portions.

The articulated door 242 is driven between open and closed positions by a flexible drive belt 274. The drive belt 274 has an eye aperture 275 at the distal end thereof for receiving the drive pins 284 that project outboard from adjacent to the distal end of the first door section 244. The drive belt 274 has teeth 277 therealong for enabling it to be driven by a gear 272, which in turn is rotated by a gear 256A disposed at a distal end of the drive rod 130. A corresponding drive gear 256B is disposed at the opposite end of the drive rod 130 to actuate the drive belt 274 of the door path subassembly 254B

With further reference to FIG. 28, the drive rod 130 is rotated by operation of the door motor 124 through first and second gears 128A and 128B. The motor 124 is supported by a mounting bracket 129 disposed atop a damping pad 131, and the drive rod 130 is retained by a plurality of shaft supports 258. With this, the articulated door 242 can be smoothly moved between closed and open positions by an actuation of the motor 124, which will rotate the drive rod 130 to cause a rotation of the gear 272. The rotation of the gear 272 will cause a longitudinal movement of the eye aperture 275 of the drive belt 274. With the drive pin 284 received through the eye aperture 275 at the distal end of the drive belt 274, the door 242 will undergo a sliding movement. The drive pin 284 will travel along the drive slot 280, and the slide pins 286 and 288 will slide along the arcuate guide surface 282, which has a straight distal portion generally parallel to the drive slot 280.

When the articulated door 242 is in a closed position, the first and second door sections 244 and 246 are disposed generally coplanar with one another and with a surrounding work surface. As the articulated door 242 travels to an open position, the door 242 slides away from the top cover 234 to provide an aperture through which the arm 54 and any retained monitor 12 or other retained article can pass. The distal edge of the first door section 244 maintains a substantially consistent height as the drive pins 284 slide along the drive slots 280. The second door section 246 and the proximal portion of the first door section 244 travel downwardly as the slide pins 286 and 288 slide along the arcuate guide surface 282.

As seen in FIG. 29, closed and open sensors 276 and 278, which may alternatively be referred to as switches 276 and 278, are incorporated into the extension and retraction arrangement 10 for sensing when the articulated door 242 has reached its fully closed and fully open positions respectively. In this embodiment, the sensors 276 and 278 are retained within one or both door path subassemblies 254A and 254B. When a closed position is reached, the closed sensor 276 can be contacted by the articulated door 242, the drive belt 274, or otherwise to induce a termination of the operation of the motor 124. Similarly, when an open position is reached, the open sensor 278 can be contacted to induce a termination of the operation of the motor 124.

Looking again to FIG. 26, one can see that a subsurface enclosure 16 can be formed by a left casing 16A, a right casing 16B, a casing cover 16C, and a bottom structure 16D together with the spine member 40, which can actually form a portion of the subsurface enclosure 16. The left and right casings 16A and 16B, the casing cover 16C, the bottom structure 16D, and the spine member 40 can be joined by any suitable means including mechanical fasteners, mechanical engagement as by interlocking, welding, or any other method or combination thereof.

The trolley 42, which retains a support arm 54, can again communicate longitudinally between raised and lowered positions, such as by sliding or the rolling of wheels as described previously or otherwise, along the spine member 40. A support plate 144 is pivotally retained at the distal or upper end of the support arm 54 for retaining a monitor 12 (not shown in FIGS. 26 and 30). The raising and lowering of the trolley 52, the support arm 54, and any retained monitor 12 can be accomplished by a motor 118 that is mounted to the combined trolley 42 and arm 54 to move therewith. The motor 118 rotates a pinion gear 120 that travels along a rack gear 122 retained by or directly formed in the spine member 40 as shown in FIG. 26.

Depicted in FIG. 26, a lower limit switch 139 or other sensor means can sense when the trolley 42 has reached its fully lowered position, and an upper limit switch 127 or other sensor means can sense when the trolley 42 reaches its fully raised position. The upper and lower limit switches 127 and 139 can be mounted to the spine 40 as shown or otherwise retained relative to the subsurface enclosure 16 to sense the upper and lower positions of the trolley 42. It would alternatively be possible to retain a sensor or sensors to move with the trolley 42 to sense upper and lower terminal positions relative to the subsurface enclosure 16.

Figure 30:
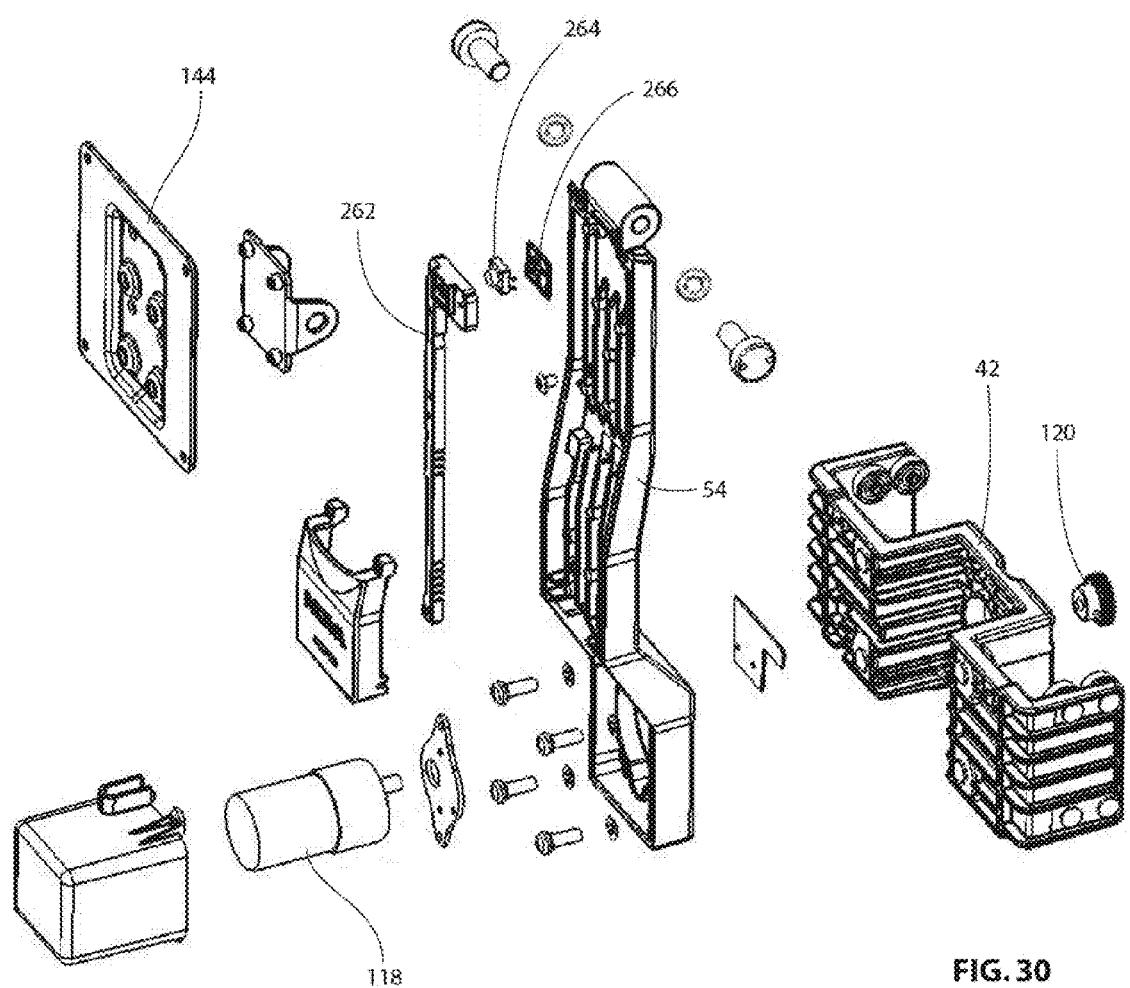
FIG. 30 is an exploded perspective view of a motorized trolley and arm configuration depicted with a monitor angle sensor.
Figure 31:
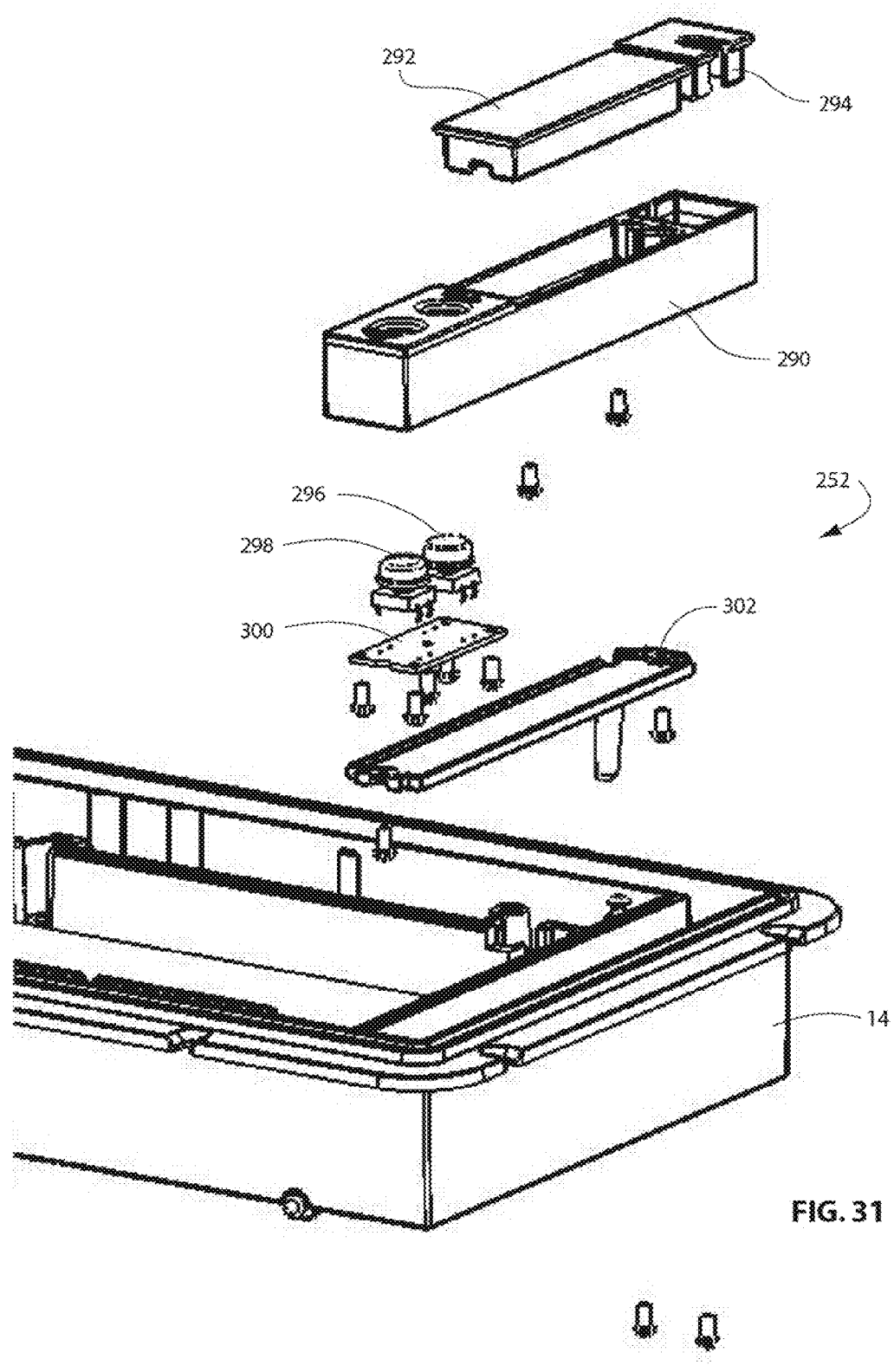
FIG. 31 is an exploded perspective view of a switching arrangement as taught hereunder.

As shown in FIG. 30, a monitor position sensor 264, which can alternatively be termed a switch, is supported by a safety switch support 262 and is backed by a safety switch cover 266. The motion position sensor 264 is contacted or compressed by the support plate 144 when the support plate 144 is in a fully upright position. So disposed, the monitor position sensor 264 senses whether the support plate 144 and thus a retained monitor 12 are upright and thus ready to be retracted or a position away from upright and thus not prepared for retraction.

Looking again to FIG. 25, a switch button insert subassembly 252 is received into and retained by a first end of the upper framework 14, and an insert 250 is received into a second end of the upper framework 14. The switch button subassembly 252, which is shown in an exploded view in FIG. 31, has a casing 290 that receives an insert cap 292 and a wire cap 284. An UP button 296 and a DOWN button 298 are retained relative to a circuit board 300, which is secured to an insert cover 302. The UP and DOWN buttons 296 and 298, the upper and lower limit switches 127 and 139, the monitor position sensor 264, the motors 118 and 124, and further electrical components of the arrangement 10 can be electronically coupled, whether via wires, wirelessly, or a combination thereof, to a power control box 260. While the UP and DOWN buttons 296 and 298 are depicted as physically incorporated into the framework 14, it is certainly within the scope of the invention to provide a remote control unit 174 as shown in FIG. 11.

Figure 32:
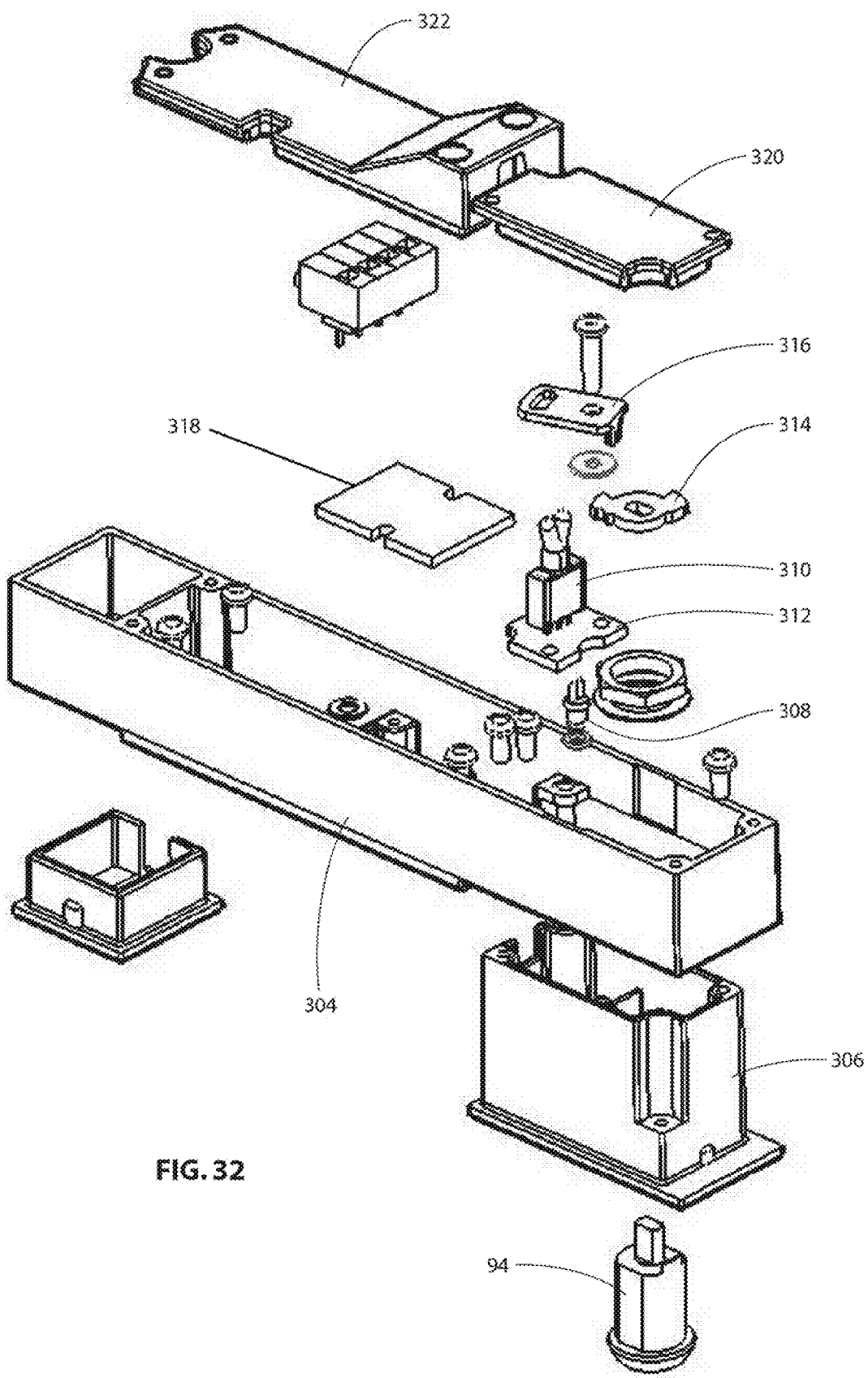
FIG. 32 is an exploded view of a locking arrangement that can be employed under the present invention.
Figure 33:
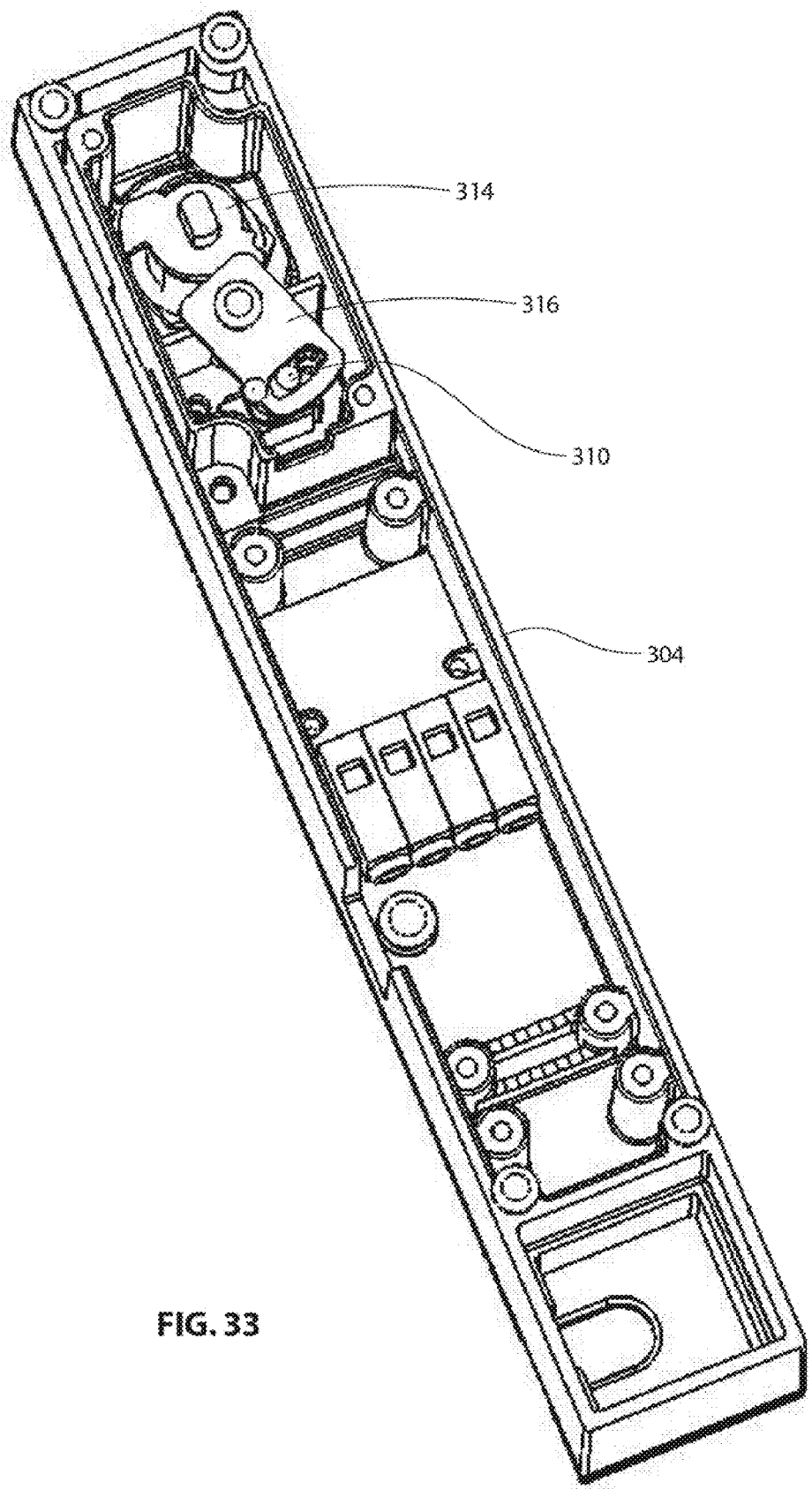
FIG. 33 is an assembled perspective view of the locking arrangement of FIG. 32.

Embodiments of the extension and retraction arrangement 10 can additionally incorporate a lock subassembly, which is shown in FIG. 32 in an exploded configuration and assembled in FIG. 33. The lock subassembly is founded on a casing 304, which can be incorporated into the insert 250 or otherwise disposed. An LED insert cap 306 is received into and retained by the casing 304. A mechanical lock 94 is received into the casing 304, and a toggle switch 310 is retained on a circuit board 312. An LED 308 is electrically coupled to the toggle switch 310, and a supplemental circuit board 318 is secured relative to the casing 304. The mechanical lock 94 actuates a plate lock member 314, which actuates an activator plate 316. A lock insert cover 320 and an insert wiring cover 322 enclose the open inner volume of the casing 304.

The installation and operation of extension and retraction arrangements 10 according to the present invention can be governed and controlled by a motion control system. The motion control system is designed to ensure that the trolley 42, the support arm 54, and any retained monitor 12 rise and lower and that the articulated door 242 opens and closes reliably, safely, and effectively. The motion control system can govern and control the installation and operation of a single extension and retraction arrangement 10 or a plurality of extension and refraction arrangements 10 functionally interconnected, such as in series or in parallel, wired or wirelessly.

When appropriate, such as on initial installation of the arrangement 10, replacement of the monitor 12, or after repair, the arrangement 10 can be placed in an installation mode, such as automatically or by a control switch 265 or other means electrically associated with the power control box 260 and disposed on the insert 250 or elsewhere. In addition to the setting of the switch 265, the installation mode can be indicated by the actuation or non-actuation of an indicator light 267. The control switch 265 and the indicator light 267 could alternatively elsewhere, such as on the power control box 260 and rendered accessible through or from exterior to the subsurface enclosure 16.

When the arrangement 10 is adjusted to or otherwise disposed in installation mode, the motion control system allows the trolley 42 to go up only once, such as in response to the UP button 296 being pressed. The DOWN button 298 is inoperable when the arrangement 10 is in installation mode. Once the trolley 42 reaches a fully raised position as sensed by the upper limit switch 127, the arrangement 10 will shut down. Under this shutdown status, the arrangement 10 will not operate even upon a pressing of the UP or DOWN buttons 296 and 298. If a monitor 12 was not already in place, the monitor 12 can then be attached to the support plate 144 while the support arm 54 is raised.

After the trolley 42 is raised and the upper limit switch 127 is tripped indicating successful installation, the user can switch the arrangement 10 to operation mode, again potentially by use of the control switch 265. The indicator light 267 can provide an indication of the operational mode status. The user can then press the UP button 296, which will cause the raising procedure to complete with the articulated door 242 sliding closed until the closed sensor 276 is tripped. With that, the arrangement 10 is rendered fully operational with the trolley 42, the support arm 54, and any retained monitor 12 in a raised position. With the support arm 54 so disposed, the flipper door 236 and the pocket door 238 are disposed in an open position, and the support arm 54 is received through the aperture 25 such that an entirely sealed surface is presented. Alternatively, the user can press the DOWN button 298, which will cause the trolley 42 to travel to a down position where it will come to a stop on actuation of the lower limit switch 139. The articulated door 242 will then be slid to a closed position, and the arrangement 10 is rendered fully operational with the articulated door 242, the flipper door 236, and the pocket door 238 presenting a substantially continuous surface.

With a monitor 12 properly installed and the arrangement 10 fully operational, there are two possibilities that should be accommodated. First, where the user adjusts the switch 265 to installation mode while the trolley 42 is in a raised position, the arrangement should not perform any functions. Such a situation might arise, by way of example, when an originally installed monitor 12 is being replaced. Second, the end user can adjust to installation mode while the trolley 42 and the monitor 12 are in a down position. In that case, the arrangement 10 will perform as programmed for installation mode as described above where the trolley 42 will be brought to a fully raised position and the door 242 will be left in an open position on a pressing of the UP button 296. Again, this may be warranted, for example, when the originally installed monitor 12 is to be replaced.

During normal usage of the extension and retraction arrangement 10, the motion control system establishes a DOWN sequence of operation and an UP sequence of operation. In the DOWN sequence of operation, the trolley 42 begins from a fully raised position with the articulated door 242 in a closed position. The pressing of the DOWN button 298 will activate the door motor 124, which will slide the articulated door 242 to an open position. Once the articulated door 242 reaches the open position as indicated by an engagement of the open sensor 278, the trolley motor 118 is actuated to lower the trolley 42 toward a lowered position. Once the trolley 42 triggers the lower limit switch 139, the door motor 124 will be actuated to slide the articulated door 242 toward a closed position. Once the articulated door 242 reaches the closed position as indicated by an engagement of the closed sensor 276, the door motor 124 will stop thereby placing the arrangement 10 in a closed or storage configuration. The flipper door 236 and the pocket door 238 will engage one another, and the arrangement 10 will be effectively sealed. When the trolley 42 is in a lowered position, the DOWN button 298 will be disabled such that pressing the DOWN button 298 will not send any signal through the arrangement 10.

In the UP sequence of operation where the trolley 42 begins from a fully lowered position, the end user can press the UP button 296. Pressing the UP button 296 will induce the door motor 124 into operation causing the articulated door 242 to slide toward an open position. Once the articulated door 242 reaches the open position as indicated by an engagement of the open sensor 278, the trolley motor 118 is actuated to raise the trolley 42 toward a raised position. As the trolley 42 and the support arm 54 rise, the flipper door 236 will be contacted and pivoted upwardly. Once the trolley 42 triggers the upper limit switch 127, the door motor 124 will be actuated to slide the articulated door 242 toward a closed position. As the door 242 slides to a closed position, the pocket door 238 will contact the support arm 54 and will pivot downwardly. Once the articulated door 242 reaches the closed position as indicated by an engagement of the closed sensor 276, the door motor 124 will stop thereby placing the arrangement 10 in a raised or use configuration. The support arm 54 will be received through the arm aperture 25 with the flipper door 236 pivoted upwardly and resting against the support arm 54 and the pocket door 238 pivoted downwardly. When the trolley 42 is in a raised position, the UP button 296 will be disabled such that pressing the UP button 296 will not send any signal through the arrangement 10.

The UP and DOWN sequences rely on the monitor 12 being fully upright as indicated by the support plate 144 contacting the monitor position sensor 264. Where the monitor position sensor 264, which is interposed between the support plate 144 and the support arm 54, is not actuated as by being fully compressed or otherwise, all power to the arrangement 10 will be cut thereby preventing potentially damaging operation while the monitor 12 is tilted away from an upright disposition. Consequently, where the monitor 12 and support plate 144 are in an angled disposition thereby disengaging the monitor position sensor 264, power will not be allowed to flow through the arrangement 10 and the motors 118 and 124 and other components will power down whether the trolley 42 is in motion, in a raised position, or in a lowered position.

Where the trolley 42 is stopped while in motion, such as by a disengaging of the sensor 264, restarting the arrangement 10 under the motion control system can be carried out under a restarting procedure. The user will first adjust the monitor 12 to an upright position thereby causing the monitor position sensor 264 to be engaged. With that, the arrangement 10 will again permit the flow of power. The user can then press the UP button 296 causing the arrangement 10 to begin the UP sequence from the position the trolley 42 was in when the monitor position sensor 264 was disengaged. The DOWN button 298 will be disabled such that pressing the DOWN button 298 will not induce any operation in the arrangement 10.

The door motor 124 has a means for sensing current in excess of a predetermined value electrically associated therewith, such as by being part of the program built into the motion control system. The over-current sensor senses a spike in amperage caused by an obstruction of the motion of the articulated door 242 or another malfunction of the door 242. When the amperage reaches a predetermined value, such as 0.28-0.30 A in one embodiment of the arrangement 10, the sequence will be stopped. Once the obstruction is removed, the user has the choice of pressing the UP or DOWN buttons 296 or 298. If the user presses the UP button 296, the arrangement 10 and the door 242 in particular will continue the UP sequence from the position it was in before the current spike. If the user presses the DOWN button 298, the arrangement 10 and the door 242 will continue the down sequence from the position the door 242 was in before the current spike.

The motion control system additionally provides capabilities for accommodating power outages under each possible operating condition. If a power outage occurs while the trolley 42 is fully raised, the trolley 42 will remain in the raised position when power is restored. Likewise, if a power outage occurs while the trolley 42 is in a fully lowered disposition, the trolley 42 will remain in the lowered position when power is restored. If power fails while the trolley 42 is moving upwardly, the user can press the UP button 296 once power is restored to cause the arrangement 10 to begin the UP sequence from the position the trolley 42 was in when the power failed. The DOWN button 298 will be disabled such that pressing the DOWN button 298 will not induce any operation in the arrangement 10. Where there is a power failure while the trolley 42 is being lowered, the user can press the UP button 296 once power is restored to cause the arrangement 10 to begin the UP sequence from the position the trolley 42 was in when the power failed. The DOWN button 298 will be disabled such that pressing the DOWN button 298 will not induce any operation in the arrangement 10. Finally, if there is a power failure while the trolley 42 is being raised while in installation mode, the user can press the UP button 296 once power is restored to cause the arrangement 10 to begin the UP sequence in the installation mode from the position the trolley 42 was in when the power failed. Again, the DOWN button 298 will be disabled such that pressing the DOWN button 298 will not induce any operation in the arrangement 10.

The extension and retraction arrangement 10 can have an on/off switch 269, which could be disposed on the control box 260, on the insert 250 as shown in FIG. 26, or elsewhere. The on/off switch 269 gives the user the ability to control the passage of power from a power source to the power control box 260 and the arrangement 10 in general. Permitting the arrangement 10 to be powered off when not in use without affecting the surrounding environment gives added control over the arrangement 10 and significantly improves the life of the electronic components of the arrangement 10. When the on/off switch 269 is in an ON position, the power control box 260 will receive constant power, and, when the switch 269 is in an OFF position, the power control box 260 will not receive any power and will not function. In all operating conditions, the arrangement 10 will react to power being shut off via the power switch 269 as it would if power were unintentionally interrupted due to a power outage, power surge, or the like.

The trolley motor 118 and power control box 260 additionally incorporate a means for sensing excess current that acts as a component of the motion control system to protect the arrangement 10 from an overload while the trolley 42 is in motion. If there is an obstruction to the movement of the trolley 42 while it is in motion, the motion control system will stop the trolley 42 when the over-current sensor senses a current equal to or greater than a predetermined value, such as 0.68 A in one contemplated embodiment, which is designed to correspond to 15 KG to 20 KG weight of obstruction. Once the trolley 42 is stopped, all power to the arrangement 10 will be shut down. Once the obstruction is removed, the user can press the UP button 296. The arrangement 10 will then follow the UP sequence from the position it was in before the current spike. The DOWN button 298 will be disabled such that pressing it will not induce any operation of the arrangement 10.

The arrangement 10 can further include a fuse resistor within the power control box 260. When tripped, the fuse resistor stops the electrical and mechanical functions of the arrangement 10 to avoid damaging other components. The fuse resistor can be soldered to the pc board of the power control box with legs that raise the fuse resistor off of the pc board to keep the fuse resistor out of direct contact with all other components. In one contemplated embodiment, the fuse resistor is rated at 0.7 A.

There are three conditions, which are described as conditions A, B, and C below, where the trolley 42 will refuse to function or will stop functioning in the middle of a sequence. No matter which conditions A, B, or C under which the trolley 42 stops, the arrangement 10 will function the same once it is returned to operative condition and the user presses the UP button 296. Under a fourth condition, which is described as condition D below, the arrangement 10 will permit the user to press the UP or DOWN buttons 296 or 298 to induce the UP or DOWN sequences once the arrangement 10 is returned to the operative condition.

In condition A, the monitor position sensor condition, the arrangement 10 can be assumed to have the trolley 42 in a raised disposition and the articulated door 242 in a closed position. When the user presses the DOWN button 298, the door 242 will be opened. Once the door open sensor 278 is engaged, the trolley motor 118 will be actuated to move the trolley 42 toward the lowered position. When the trolley 42 is partly lowered, the monitor position sensor 264 becomes disengaged. Power to the motor 118 is cut, and the trolley 42 immediately stops. When the monitor position sensor 264 is re-engaged, the trolley 42 will be idle. The DOWN button 296 is inoperable. The user can induce operation only by pressing the UP button 298, which will cause the arrangement 10 to follow the UP sequence with the trolley 42 moving to a raised position and the door 242 then sliding to a closed position.

Under condition B, the trolley motor over-current sensor protection condition, the arrangement 10 can be assumed to have the trolley 42 in a lowered disposition and the articulated door 242 in a closed position. When the user presses the UP button 298, the articulated door 242 will be moved to an open position. Once the door open sensor 278 is engaged, the trolley motor 118 will be actuated to move the trolley 42 toward the raised position. During the upward travel of the trolley 42, an obstruction hampers further motion of the trolley 42. When the trolley motor over-current sensor senses the predetermined current spike, such as to 0.68 A, power to the trolley motor 118 will be terminated, and the trolley 42 will stop. Once the obstruction is removed, the user can press the UP button 298, which will cause the arrangement 10 to follow the UP sequence with the trolley 42 traveling to a raised position and the door 242 then sliding to a closed position. The DOWN button 296 is inoperable.

Under condition C, the power outage condition, the arrangement 10 can be assumed to have the trolley 42 in a raised disposition and the articulated door 242 in a closed position. When the user presses the DOWN button 296, the articulated door 242 will be moved to an open position. Once the door open sensor 278 is engaged, the trolley motor 118 will be actuated to move the trolley 42 toward the lowered position. During the downward travel of the trolley 42, a power failure stops the motion of the trolley 42. Once the power is returned, the user can press the UP button 298, which will cause the arrangement 10 to follow the UP sequence with the trolley 42 traveling to a raised position and the door 242 sliding to a closed position. The DOWN button 296 is inoperable.

In condition D, the door motor over-current sensor condition, the arrangement 10 can be assumed to have the trolley 42 in a raised disposition and the articulated door 242 in a closed position. When the user presses the DOWN button 298, the door 242 will begin to open. As the door 242 is opening, an obstruction prevents further movement and the door motor over-current sensor senses the predetermined current spike whereupon power to the door motor 124 is terminated and the door 242 stops. Once the obstruction is removed, the user can press the UP button 298 or the DOWN button 296. If the UP button 298 is pressed, the door 242 will begin to close and will continue until the door closed sensor 276 is triggered, and the trolley 42 does not move. If the DOWN button 296 is pressed, the door 242 will begin to open and will continue until the door open sensor 278 is triggered. The arrangement 10 will continue to follow the down sequence with the trolley 42 moving to a lowered position and the door 242 then sliding to a closed position.

With certain details of the present invention for a motion control system for an extension and retraction arrangement disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the invention. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. An extension and retraction arrangement with a control system for adjusting a monitor from a retracted configuration to an extended configuration, the extension and retraction arrangement comprising:

a trolley structure;

a means for retaining a monitor to travel with the trolley structure;

an elongate support arrangement with a first end, a second end, and a body portion between the first and second ends;

a means for retaining the trolley structure for axial extension and retraction along the body portion of the elongate support arrangement from adjacent to the first end to adjacent to the second end of the elongate support arrangement;

a means for propelling the trolley structure to travel along the body portion of the elongate support arrangement;

a framework fixed adjacent to the second end of the elongate support arrangement wherein the framework has a centrally disposed aperture wherein the monitor projects through the aperture in the framework when the trolley structure is disposed adjacent to the second end of the elongate support arrangement;

a door with an open position and a closed position for at least partially closing the aperture in the framework;

a means for propelling the door between an open position and a closed position;

a control system for controlling the extension and retraction of the trolley structure and an opening and closing of the door wherein the control system has an operation mode with an UP sequence and a DOWN sequence, wherein the extension and retraction arrangement has a storage configuration with the door in a closed position and the trolley structure and the monitor disposed below the door, and wherein the extension and refraction arrangement has a use configuration with the monitor extended beyond the door and the door in a closed position; and a means for enabling a user to induce the UP sequence and the DOWN sequence;

wherein the UP sequence of the control system comprises adjusting the door to an open position, propelling the trolley structure and the monitor to an extended disposition with the monitor disposed beyond the aperture in the framework, and adjusting the door to a closed position to achieve the use configuration and wherein the DOWN sequence of the control system comprises adjusting the door to an open position, propelling the trolley structure and the monitor to a refracted disposition with the monitor disposed below the aperture in the framework, and adjusting the door to a closed position to achieve the storage configuration.

2. The extension and retraction arrangement of claim 1 wherein the control system further comprises an open sensor for sensing the open position of the door, a closed sensor for sending the closed position of the door, an upper limit sensor for sensing the extended disposition of the trolley structure and the monitor, and a lower limit sensor for sensing the retracted disposition of the monitor and the trolley structure.

3. The extension and refraction arrangement of claim 2 wherein the UP sequence of the control system comprises adjusting the door to an open position until the open sensor is actuated, then propelling the trolley structure and the monitor to an extended disposition with the monitor disposed beyond the aperture in the framework until the upper limit sensor is actuated, and then adjusting the door to a closed position until the closed sensor is actuated to achieve the use configuration and wherein the DOWN sequence of the control system comprises adjusting the door to an open position until the open sensor is actuated, then propelling the trolley structure and the monitor to a retracted disposition with the monitor disposed below the aperture in the framework until the lower limit sensor is actuated, and then adjusting the door to a closed position until the closed sensor is actuated to achieve the storage configuration.

4. The extension and retraction arrangement of claim 1 wherein the means for retaining the monitor to travel with the trolley structure comprises a support arm and further comprising an arm aperture portion in the door for receiving the support arm when the extension and retraction arrangement is in a use configuration.

5. The extension and retraction arrangement of claim 4 further comprising a pocket door pivotally coupled to the door and a means for retaining the pocket door in a closed position to close the arm aperture portion in the door when the extension and refraction arrangement is in a storage configuration.

6. The extension and retraction arrangement of claim 5 further comprising an arm aperture portion in the framework aligned with the arm aperture portion in the door, a flipper door pivotally coupled to the framework, and a means for retaining the flipper door in a closed position to close the arm aperture portion in the framework when the extension and refraction arrangement is in a storage configuration.

7. The extension and retraction arrangement of claim 6 wherein the door is slidable between the open and closed positions and wherein the means for retaining the pocket door and the flipper door in closed positions comprises an interlocking of the pocket door and the flipper door.

8. The extension and retraction arrangement of claim 1 further comprising a means for sensing an obstruction to travel of the trolley structure along the elongate support arrangement and wherein the control system automatically terminates travel of the trolley structure and the UP or DOWN sequence in response to the obstruction.

9. The extension and retraction arrangement of claim 8 wherein the control system permits a user to induce only the UP sequence upon a removal of the obstruction to travel of the trolley structure wherein the DOWN sequence is disabled until the UP sequence achieves the use configuration.

10. The extension and retraction arrangement of claim 1 wherein the control system automatically terminates the UP or DOWN sequence in response to a power failure and wherein the control system permits a user to induce only the UP sequence upon a return of power wherein the DOWN sequence is disabled until the UP sequence achieves the use configuration.

11. The extension and retraction arrangement of claim 1 wherein the control system further comprises an installation mode and wherein the extension and retraction arrangement has an installation configuration when in the installation mode with the trolley structure disposed adjacent to the second end of the elongate support arrangement and the door in an open configuration.

12. The extension and retraction arrangement of claim 11 wherein the control system is adjustable between the installation mode and the operation mode.

13. The extension and retraction arrangement of claim 12 wherein the control system permits a completion of the UP sequence or the DOWN sequence upon adjustment from the installation mode to the operation mode.

14. An extension and retraction arrangement with a control system for adjusting a monitor from a retracted configuration to an extended configuration, the extension and retraction arrangement comprising:
a trolley structure;
a means for retaining a monitor to travel with the trolley structure;
an elongate support arrangement with a first end, a second end, and a body portion between the first and second ends;
a means for retaining the trolley structure for axial extension and retraction along the body portion of the elongate support arrangement from adjacent to the first end to adjacent to the second end of the elongate support arrangement;
a means for propelling the trolley structure to travel along the body portion of the elongate support arrangement;
a framework fixed adjacent to the second end of the elongate support arrangement wherein the framework has a centrally disposed aperture wherein the monitor projects through the aperture in the framework when the trolley structure is disposed adjacent to the second end of the elongate support arrangement;
a door with an open position and a closed position for at least partially closing the aperture in the framework;
a means for propelling the door between an open position and a closed position;
a control system for controlling the extension and retraction of the trolley structure and an opening and closing of the door wherein the control system has an operation mode with an UP sequence and a DOWN sequence, wherein the extension and retraction arrangement has a storage configuration with the door in a closed position and the trolley structure and the monitor disposed below the door, and wherein the extension and refraction arrangement has a use configuration with the monitor extended beyond the door and the door in a closed position; and
a means for enabling a user to induce the UP sequence and the DOWN sequence;
wherein the means for retaining the monitor to travel with the trolley structure comprises a means for pivotally retaining the monitor between an upright configuration and an angled configuration and further comprising a means for sensing whether the monitor is in an upright configuration and wherein the control system automatically prevents extension and retraction of the trolley structure when the monitor is not in an upright configuration.

15. The extension and retraction arrangement of claim 14 wherein the control system permits a user to induce only the UP sequence upon the monitor being adjusted to the upright configuration wherein the DOWN sequence is disabled until the UP sequence achieves the use configuration.

16. An extension and retraction arrangement with a control system for adjusting a monitor from a retracted configuration to an extended configuration, the extension and retraction arrangement comprising:
- a trolley structure;
- a means for retaining a monitor to travel with the trolley structure;
- an elongate support arrangement with a first end, a second end, and a body portion between the first and second ends;
- a means for retaining the trolley structure for axial extension and retraction along the body portion of the elongate support arrangement from adjacent to the first end to adjacent to the second end of the elongate support arrangement;
- a means for propelling the trolley structure to travel along the body portion of the elongate support arrangement;
- a framework fixed adjacent to the second end of the elongate support arrangement wherein the framework has a centrally disposed aperture wherein the monitor projects through the aperture in the framework when the trolley structure is disposed adjacent to the second end of the elongate support arrangement;
- a door with an open position and a closed position for at least partially closing the aperture in the framework;
- a means for propelling the door between an open position and a closed position;
- a control system for controlling the extension and retraction of the trolley structure and an opening and closing of the door wherein the control system has an operation mode with an UP sequence and a DOWN sequence, wherein the extension and retraction arrangement has a storage configuration with the door in a closed position and the trolley structure and the monitor disposed below the door, and wherein the extension and refraction arrangement has a use configuration with the monitor extended beyond the door and the door in a closed position;
- a means for enabling a user to induce the UP sequence and the DOWN sequence; and
- a means for sensing an obstruction to a movement of the door wherein the control system automatically terminates the UP or DOWN sequence in response to the obstruction.

17. The extension and retraction arrangement of claim 16 wherein the control system permits a user to induce only the UP sequence upon a removal of the obstruction to the movement of the door wherein the DOWN sequence is disabled until the UP sequence achieves the use configuration.

* * * * *